(12) United States Patent
Suehiro et al.

(10) Patent No.: US 11,742,709 B2
(45) Date of Patent: Aug. 29, 2023

(54) AXIAL GAP MOTOR HAVING A VOID PORTION PROVIDED FOR THE INCREASED TORQUE OF SAID MOTOR

(71) Applicant: Seiko Epson Corporation, Toyko (JP)

(72) Inventors: Takuru Suehiro, Shiojiri (JP); Hidenobu Maruyama, Azumino (JP)

(73) Assignee: SEIKO EPSON CORPORATION

( * ) Notice: Subject to any disclaimer, the term of this patent is extended or adjusted under 35 U.S.C. 154(b) by 211 days.

(21) Appl. No.: 17/238,293

(22) Filed: Apr. 23, 2021

(65) Prior Publication Data

US 2021/0336494 A1  Oct. 28, 2021

(30) Foreign Application Priority Data

Apr. 24, 2020  (JP) .................. 2020-077233

(51) Int. Cl.
| | |
|---|---|
| *H02K 1/18* | (2006.01) |
| *H02K 1/14* | (2006.01) |
| *H02K 3/28* | (2006.01) |
| *H02K 15/02* | (2006.01) |
| *H02K 1/2706* | (2022.01) |
| *H02K 3/52* | (2006.01) |

(52) U.S. Cl.
CPC ............... *H02K 1/182* (2013.01); *H02K 1/14* (2013.01); *H02K 1/2706* (2013.01); *H02K 3/28* (2013.01); *H02K 3/522* (2013.01); *H02K 15/02* (2013.01); *H02K 2203/12* (2013.01)

(58) Field of Classification Search
CPC ............ H02K 1/14; H02K 1/18; H02K 1/182; H02K 1/27; H02K 1/2706; H02K 15/02; H02K 2203/12

USPC ................................................... 310/216.061
See application file for complete search history.

(56) References Cited

U.S. PATENT DOCUMENTS

| | | | |
|---|---|---|---|
| 2017/0155297 A1* | 6/2017 | Tokoi ................ | H02K 21/24 |
| 2020/0166041 A1* | 5/2020 | Shi .................... | F04D 19/048 |
| 2021/0044162 A1* | 2/2021 | Maruyama ......... | H02K 21/24 |

(Continued)

FOREIGN PATENT DOCUMENTS

| | | |
|---|---|---|
| JP | 2006-280052 A | 10/2006 |
| JP | 2006-353054 A | 12/2006 |
| JP | 2011-066979 A | 3/2011 |

(Continued)

*Primary Examiner* — Rashad H Johnson
(74) *Attorney, Agent, or Firm* — Harness, Dickey & Pierce, P.L.C.

(57) ABSTRACT

An axial gap motor includes a rotor and a stator disposed to be separated with a gap from the rotor in a direction parallel to a rotation axis of the rotor. The stator includes a bobbin housing a coil and a core provided on an inside of the bobbin and configured by a plurality of magnetic sections. A first magnetic section among the plurality of magnetic sections is in contact with an inner peripheral wall of, among side portions of the bobbin, a first side portion opposed to a side portion of a bobbin on one side adjacent to the bobbin. A second magnetic section among the plurality of magnetic sections is in contact with an inner peripheral wall of, among the side portions of the bobbin, a second side portion opposed to a side portion of a bobbin on the other side adjacent to the bobbin. A void portion is present between the first magnetic section and the second magnetic section.

14 Claims, 18 Drawing Sheets

(56) References Cited

U.S. PATENT DOCUMENTS

2022/0376567 A1* 11/2022 Takazawa .............. H02K 1/141

FOREIGN PATENT DOCUMENTS

| JP | 2012-023879 A | 2/2012 |
|----|---------------|--------|
| WO | 2017-094525 A1 | 6/2017 |

* cited by examiner

FIG. 10
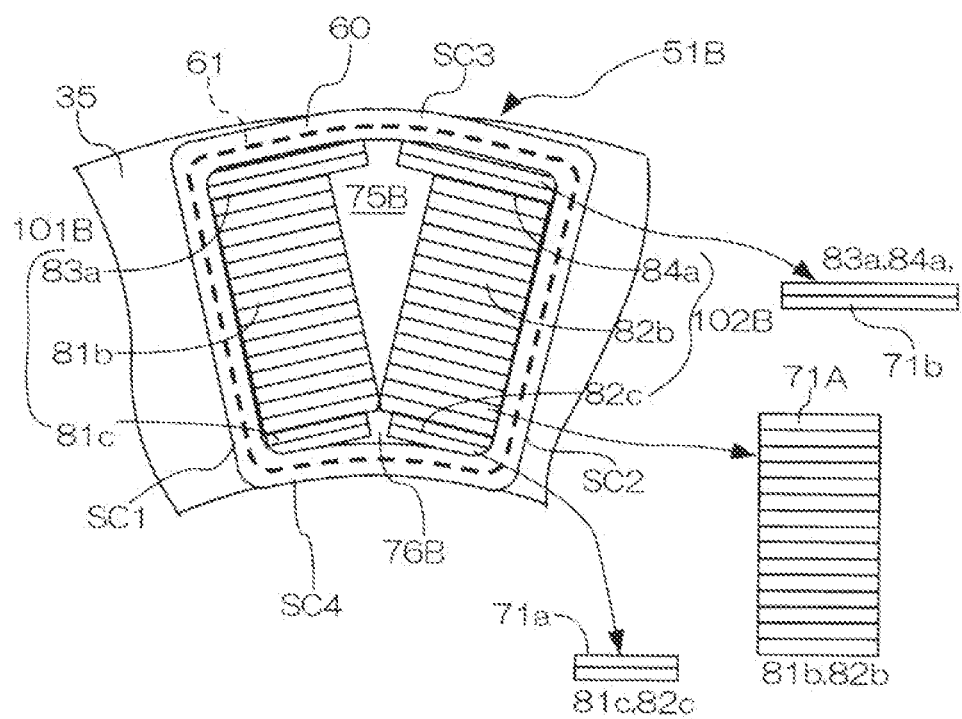
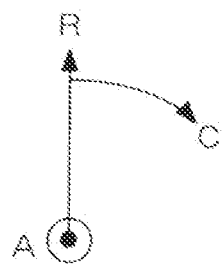

FIG. 11
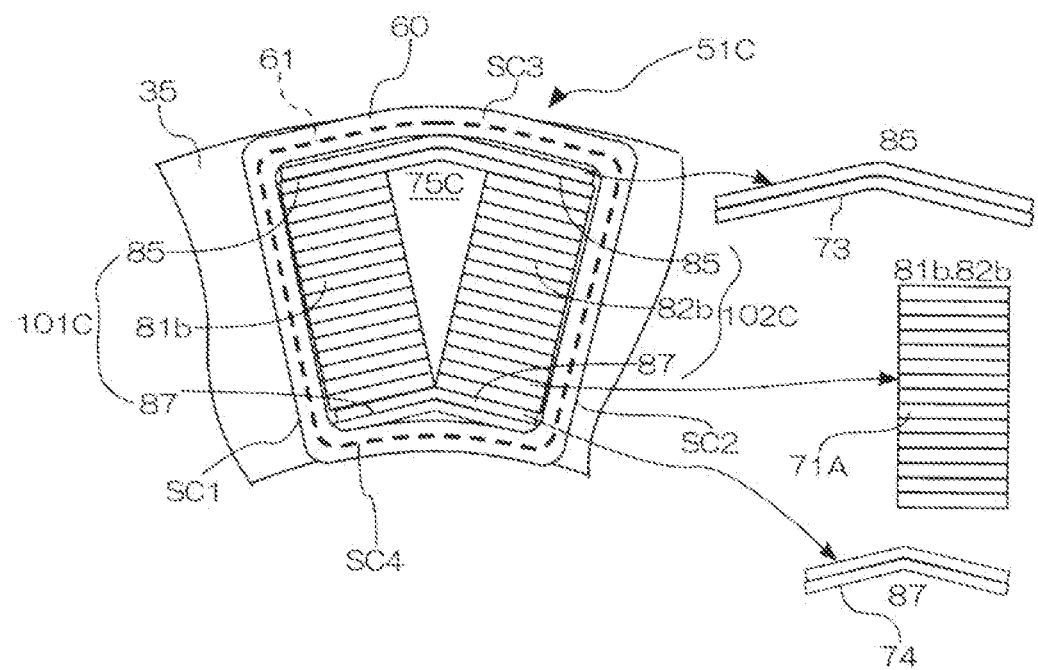
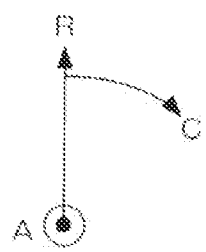

FIG. 13
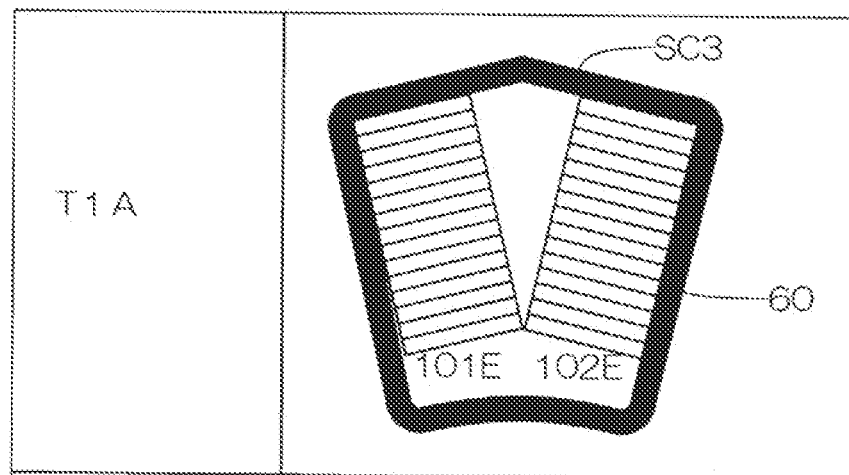
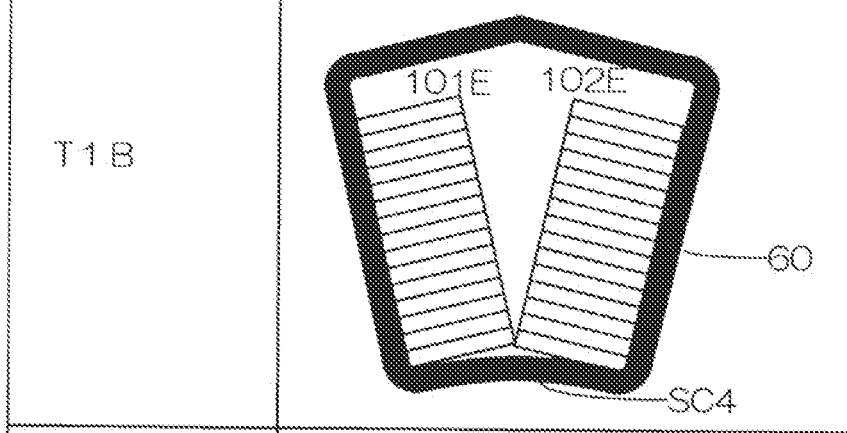
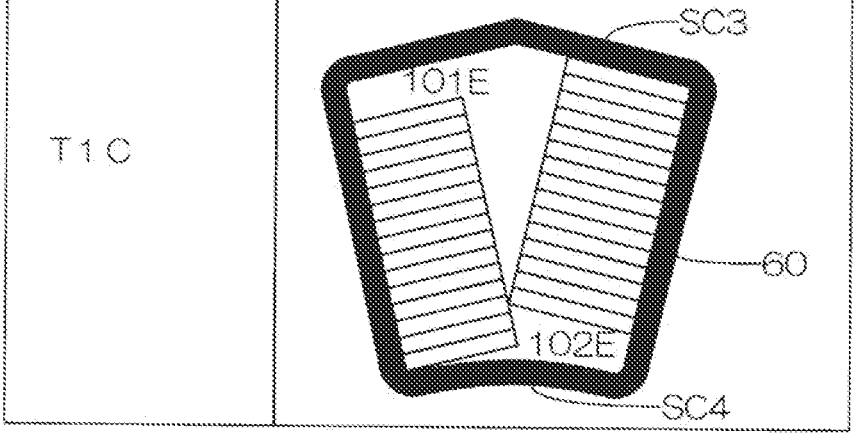

AXIAL GAP MOTOR HAVING A VOID PORTION PROVIDED FOR THE INCREASED TORQUE OF SAID MOTOR

The present application is based on, and claims priority from JP Application Serial Number 2020-077233, filed Apr. 24, 2020, the disclosure of which is hereby incorporated by reference herein in its entirety.

BACKGROUND

1. Technical Field

The present disclosure relates to an axial gap motor.

2. Related Art

An axial gap motor includes, in a rotation axis direction of a motor, a gap between a stator and a rotor where a rotating magnetic flux is formed. In such an axial gap motor, in some case, teeth are not integrally formed but, as described in JP-A-2012-23879 (Patent Literature 1), a plurality of laminated sections formed by laminating electromagnetic steel sheets are provided and separated to configure the teeth. Voids are provided among the laminated sections in order to provide high magnetic resistance portions to reduce an eddy current. In the axial gap motor described in Patent Literature 1, the electromagnetic steel sheets are laminated in an outward direction from the rotation axis center of the motor to configure the laminated sections. The laminated sections are disposed in the circumferential direction center of the teeth.

However, in the axial gap motor described in Patent Literature 1, gaps where a magnetic body is absent are formed on the circumferential direction end faces of the teeth. A magnetic path of a field magnet for rotating the rotor is increased in length. Since magnetic flux density is smaller as the magnetic path is longer, the configuration described in Patent Literature 1 has room for improvement in that the torque of the axial gap motor is sufficiently increased.

SUMMARY

The present disclosure can be realized as an aspect or an application example described below. That is, an axial gap motor according to the present disclosure is an axial gap motor including: a rotor; and a stator disposed to be separated with a gap from the rotor in a direction parallel to a rotation axis of the rotor. The stator includes: a plurality of bobbins housing coils; and a core provided on an inside of each of the bobbins and configured by a plurality of magnetic sections. A first magnetic section among the plurality of magnetic sections is in contact with an inner peripheral wall of, among side portions of the bobbin, a first side portion opposed to a side portion of a bobbin on one side adjacent to the bobbin. A second magnetic section among the plurality of magnetic sections is in contact with an inner peripheral wall of, among the side portions of the bobbin, a second side portion opposed to a side portion of a bobbin on another side adjacent to the bobbin. A void portion is present between the first magnetic section and the second magnetic section.

BRIEF DESCRIPTION OF THE DRAWINGS

FIG. 10 is an explanatory diagram showing a configuration example of a core in a third embodiment.

FIG. 11 is an explanatory diagram showing a configuration example of a core in a fourth embodiment.

FIG. 13 is an explanatory diagram showing a configuration example of a type T1 core.

DESCRIPTION OF EXEMPLARY EMBODIMENTS

A. First Embodiment

(1) Overall Configuration of an Axial Gap Motor

Figure 1:
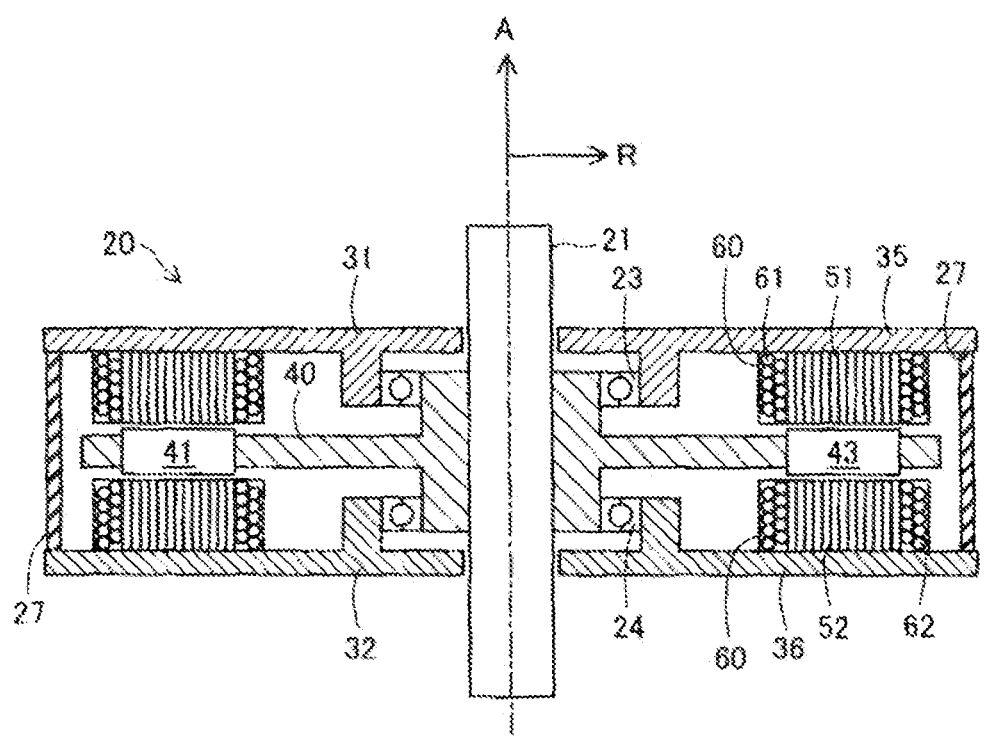
FIG. 1 is a schematic configuration diagram showing, in a sectional view, a schematic configuration of an axial gap motor in a first embodiment.

FIG. 1 is a schematic configuration diagram showing, in a sectional view, a schematic configuration of an axial gap motor 20 common to several embodiments explained below. The axial gap motor 20 has a so-called double stator structure including a rotor 40 in the axial direction center of a rotating shaft 21 and including stators 31 and 32 on both the sides in the axial direction of the rotor 40. As shown in FIG. 1, the axial direction upward direction of the rotating shaft 21 is indicated by a sign A and the radial direction outer side direction of the rotor 40 and the stators 31 and 32 with respect to the rotating shaft 21 is indicated by a sign R. The directions indicated by the signs A and R are shown in the same manner in the other figures. The direction indicated by the sign A is sometimes referred to as axial direction. The direction indicated by the sign R is sometimes referred to as radial direction. In addition to these directions, in the circumferential direction of the rotor 40 and the stators 31 and 32, a clockwise direction in a plan view from above the rotating shaft 21 is sometimes indicated by a sign C.

The rotating shaft 21 is shown as a columnar body in FIG. 1 but may be a hollow rotating shaft. In the axial gap motor 20, thickness in the axial direction A tends to be small and a dimension in the radial direction R tends to be large.

Therefore, it is also desirable to adopt a configuration in which the diameter of the rotating shaft 21 is increased to form the rotating shaft 21 as a hollow shaft and wires to the axial gap motor 20 are inserted through the inside of the hollow shaft.

Near the terminal end in the radial direction R of the rotor 40 fixed to substantially the center in the axial direction of the rotating shaft 21, a plurality of (twelve) permanent magnets 41 and 43 are uniformly disposed in the circumferential direction of the rotor 40. The number and the disposition of the permanent magnets 41 and 43 are decided by the number of phases and the number of poles of the axial gap motor 20. In the center of the rotor 40, a joining section 45, to which the rotating shaft 21 is fixed, is formed. The rotating shaft 21 is pressed into the joining section 45 and fixed. Naturally, the rotor 40 and the rotating shaft 21 may be combined by a key and a key groove.

The stators 31 and 32 are attached to the joining section 45 of the rotor 40 via bearings 23 and 24. The rotating shaft 21 and the rotor 40 are rotatably held by the bearings 23 and 24 with respect to a motor case in which the stators 31 and 32 are combined by a side surface case 27. In the stators 31 and 32, stator cores (hereinafter simply referred to as cores) 51 and 52 are provided to be opposed to the permanent magnets 41 and 43 of the rotor 40. A schematic configuration of the stator 31 is shown in the perspective view of FIG. 2. The axial gap motor 20 has a three-phase four-slot configuration. Therefore, the number of cores 51 per one stator 31 is twelve as explained above.

Figure 2:
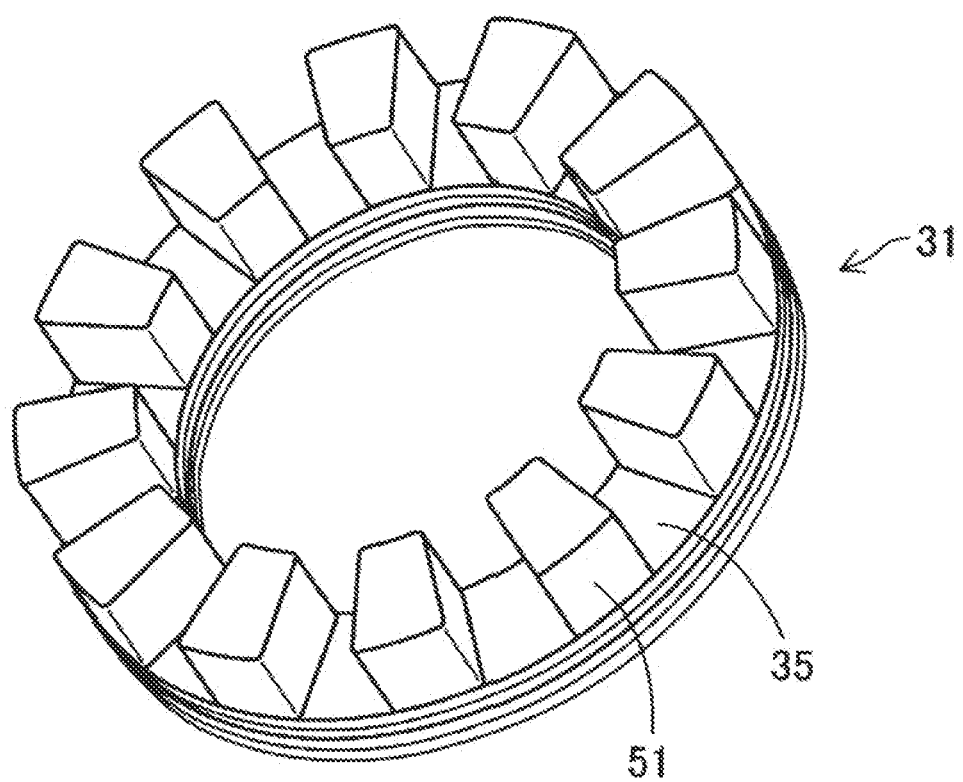
FIG. 2 is a perspective view illustrating the shape of a stator.

The stator 31 includes the twelve cores 51, a back yoke (hereinafter simply referred to as yoke) 35 provided in common to the cores 51, and coils 61, which are winding wires, disposed on the outer peripheries of the cores 51. As explained below, the coils 61 are disposed in the outer peripheries of the cores 51 in a form in which the coils 61 are housed in bobbins 60 made of synthetic resin. As shown in FIG. 2, the yoke 35 is configured by laminating electromagnetic steel sheets having an annular shape, that is, a disk shape with a hole having substantially the same width as the width in the radial direction of the cores 51 and has a predetermined thickness. The cores 51 are disposed side by side in the circumferential direction C on the yoke 35. Insulating films are formed on the surfaces of the electromagnetic steel sheets, which are sheets of magnetic bodies. After the lamination, the insulating films are melted to fix the electromagnetic steel sheets. The electromagnetic steel sheets after the lamination may be joined by application of an adhesive, welding, or half-caulking. The half-caulking is a method of pushing out, with a press, parts of the electromagnetic steel sheets in the thickness direction by approximately a half of the sheet thickness, placing a plurality of pieces of the pushed-out parts one on top of another, and pressing the pushed-out parts into hollows of the electromagnetic steel sheets adjacent to the pushed-out parts to fix the electromagnetic steel sheets. Such joining of the electromagnetic steel sheets is performed in the same manner in the cores explained below.

Figure 3:
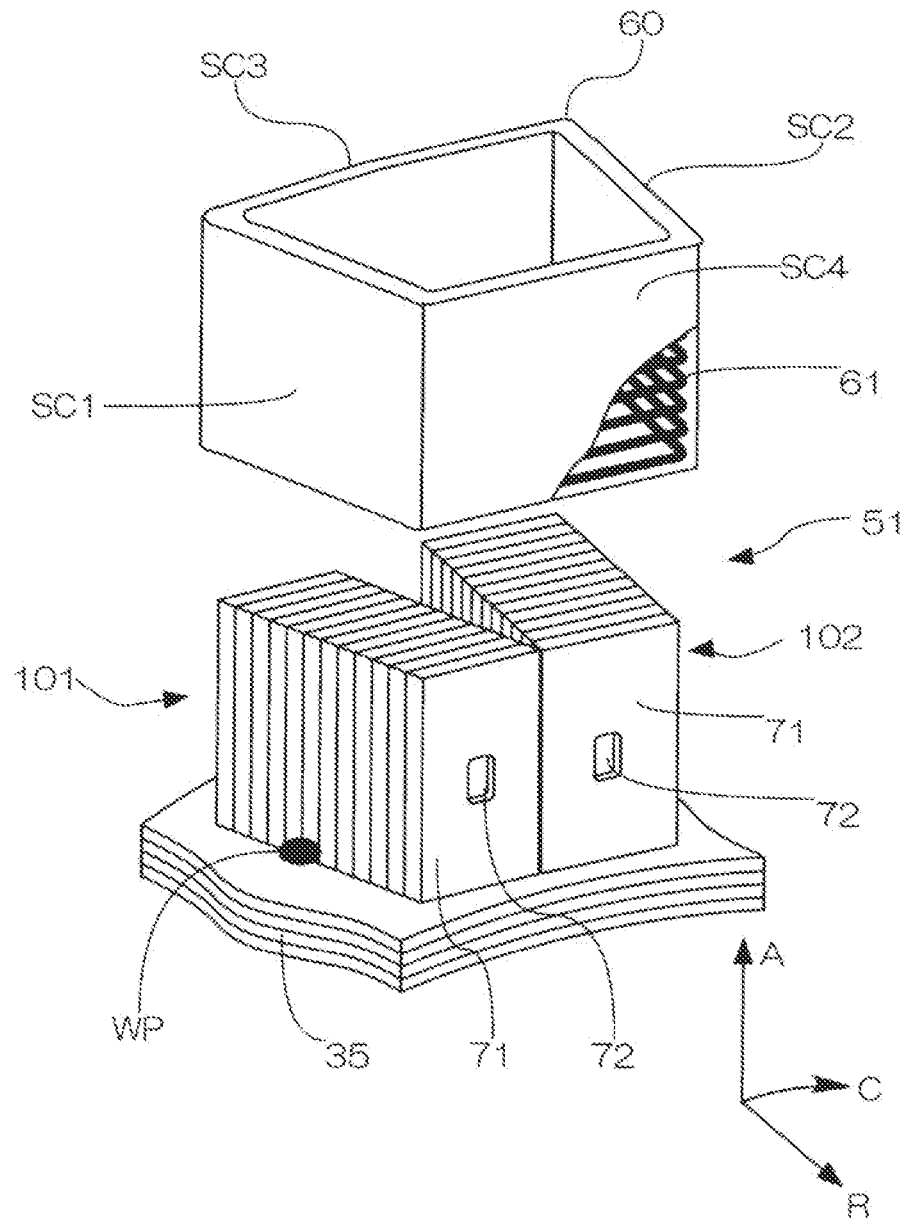
FIG. 3 is an explanatory diagram showing a configuration example of a core in the first embodiment.

The exterior of one of the cores 51 arrayed on the yoke 35 is shown in FIG. 3 as a partially exploded perspective view. As shown in FIG. 3, the core 51 in the first embodiment includes a first magnetic body 101 equivalent to a first magnetic section and a second magnetic body 102 equivalent to a second magnetic section. The first magnetic body 101 and the second magnetic body 102 are formed in the same shape by laminating electromagnetic steel sheets 71 of the same shape. The electromagnetic steel sheets 71 of the first magnetic body 101 and the second magnetic body 102 are laminated along the longitudinal direction in a shape after the lamination of the first magnetic body 101 and the second magnetic body 102. The first magnetic body 101 and the second magnetic body 102 are integrated by half-caulking using recesses 72 formed by a press near the centers of the electromagnetic steel sheets 71 and are welded in four parts WP (a part of which is not shown) on the surface of the yoke 35. The welded parts WP are positions where lower portions in both the side surface centers in the respective first and second magnetic bodies 101 and 102, that is, both side portions of the first and second magnetic bodies 101 and 102 formed by laminating the electromagnetic steel sheets 71 are in contact with the yoke 35 in the centers along the laminating direction.

Figure 4:
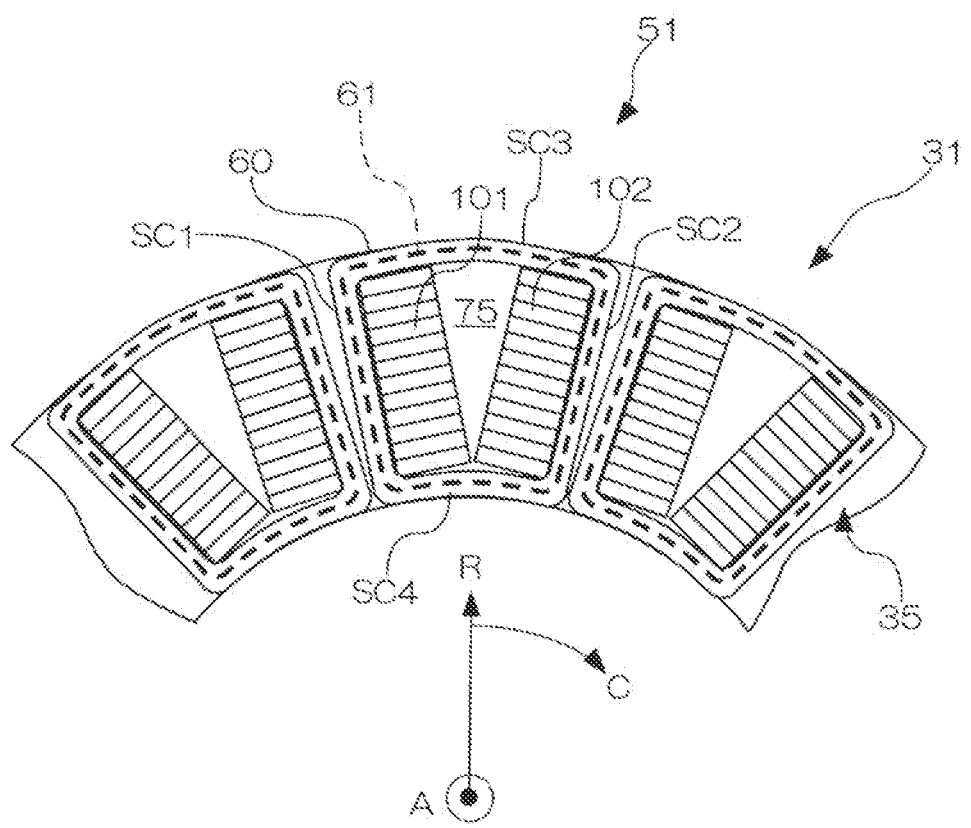
FIG. 4 is an explanatory diagram showing an example of the external shape of the core.

The coil 61 for forming a field magnet is fitted in the outer periphery of the core 51, which is welded to the yoke 35 in this way, together with the bobbin 60 in a state in which the coil 61 is housed in the bobbin 60. In FIG. 3, a part of the bobbin 60 is fractured to show a part of the coil 61 housed in the bobbin 60. As shown in FIG. 4, a plurality of bobbins 60 are disposed side by side in the circumferential direction C on the yoke 35. A state in which the bobbins 60 are attached to the core 51 is shown in FIG. 4 as a plan view. The external shape of the bobbin 60 is a shape obtained by forming an upper side and a lower side as concentric arcs in a shape approximate to a shape obtained by equally dividing the yoke 35 in a plan view in a direction along a rotation axis A by the number of cores 51, in this embodiment, a value 12, that is, a trapezoidal shape. The external shape of the bobbin 60 is continuous. However, for convenience, of two side surfaces opposed to the other bobbins 60 adjacent to, that is, neighboring the bobbin 60, a side surface present opposite to the circumferential direction C side is referred to as first side surface SC1 and a side surface present on the circumferential direction C side is referred to as second side surface SC2. Of two side surfaces along the radial direction R, a side surface on the outer side is referred to as third side surface SC3 and a side surface on the inner side is referred to as fourth side surface SC4.

As shown in FIG. 4, the first magnetic body 101 and the second magnetic body 102 are disposed to symmetrically face each other with respect to a line passing the center of the core 51 from the rotation axis A along the radial direction R. The center of the core 51 is a geometric center of the core 51 in a plan view along the rotation axis A and may be considered the center of gravity of the core 51. In this state, a side surface on one side of the first magnetic body 101 is in contact with the inner peripheral wall of the first side surface SC1 of the bobbin 60 and a side surface on one side of the second magnetic body 102 is in contact with the inner peripheral wall of the second side surface SC2 of the bobbin 60. The bobbin 60 is formed in a substantially trapezoidal shape. The first magnetic body 101 and the second magnetic body 102 are formed in a rectangular parallelepiped shape. Therefore, the inner periphery side end portions of the first magnetic body 101 and the second magnetic body 102 are close to and nearly in contact with each other. The outer periphery side end portions of the first magnetic body 101 and the second magnetic body 102 are disposed to be separated from each other. As a result, a void portion 75 is formed on the inside of the core 51. As explained above, in this embodiment, laminating directions of the electromagnetic steel sheets 71 in the first magnetic body 101 and the second magnetic body 102 are the longitudinal directions of the first magnetic body 101 and the second magnetic body 102. However, in a state in which the first magnetic body 101 and the second magnetic body 102 are combined to configure the core 51, the laminating directions do not coincide but cross. The laminating directions of the electromagnetic steel sheets 71 in the respective first and second magnetic bodies 101 and 102 are referred to as first axial direction conforming to the radial direction R. In this embodiment, the first axial direction is also symmetrical with respect to the line passing the center of the core 51 from the rotation axis A along the radial direction R.

Since the coil 61 is disposed in the outer periphery of the core 51, a magnetic flux passing the core 51 is formed by energizing the coil 61. If timing of the energization of the coil 61 is controlled and the position of the energized coil 61 is sequentially moved along the circumferential direction C to form a field magnet, the permanent magnet 41 provided in the rotor 40 is attracted by the field magnet and the rotor 40 rotates. The magnitude of torque output by the axial gap motor 20 and the like are explained below together. In this embodiment, the coil 61 is housed in the bobbin 60 and integrated. However, the coil 61 may be individually wound on the core 51.

The structure of the stator 31 is explained above. The axial gap motor 20 has the double stator structure. Another stator 32 is provided on the opposite side across the rotor 40 (see FIG. 1). Like the stator 31, the stator 32 includes twelve cores 52, a yoke 36 common to the cores 52, and coils 63 housed in the bobbins 60 and disposed in the outer peripheries of the cores 52. Twelve coils 61 attached to the twelve cores 51 configure three-phase four-pole winding wires. Two stators 31 and 32 have a surface-symmetrical structure across the rotor 40. The twelve permanent magnets 41 and 43 and the core 51 and the core 52 provided in the rotor 40 face each other across a predetermined distance gap extending along the axial direction A.

(2) Characteristics of the First Embodiment

In the axial gap motor 20 in the first embodiment explained above, the core 51 adopts a form in which magnetic bodies like electromagnetic steel sheets are absent in the entire inner side of the bobbin 60 and present only in a part of the inner side of the bobbin 60. As a result, in the axial gap motor 20 in this embodiment, effects described below are achieved.

[1] It is easy to manufacture the first magnetic body 101 and the second magnetic body 102 configuring the core 51.

[2] Torque generated when a ratio of the magnetic bodies to the area on the inner side of the bobbin 60 is less than 100% is higher compared with when the magnetic bodies are present in the center on the inner side of the bobbin 60.

Reasons for the above effects are explained below.

[1] Re: It is Easy to Manufacture the First and Second Magnetic Bodies 101 and 102

As shown in FIG. 2, in the axial gap motor 20, in order to realize high torque, the sectional shape of the core 51, which a magnetic flux passes, is formed as large as possible. The core 51 is often formed in a substantially trapezoidal shape rather than a rectangular shape. In this case, to laminate the electromagnetic steel sheets along the radial direction R or the circumferential direction C and realize a trapezoidal shape in order to reduce an eddy current, it is necessary to change the size of the electromagnetic steel sheets 71. In contrast, in this embodiment, the core 51 is formed by combining the first magnetic body 101 and the second magnetic body 102 having the rectangular parallelepiped shape. The electromagnetic steel sheets to be laminated can be one kind. The lamination of the electromagnetic steel sheets is easy.

[2] Re: Generated Torque Can Be Increased

Figure 5:
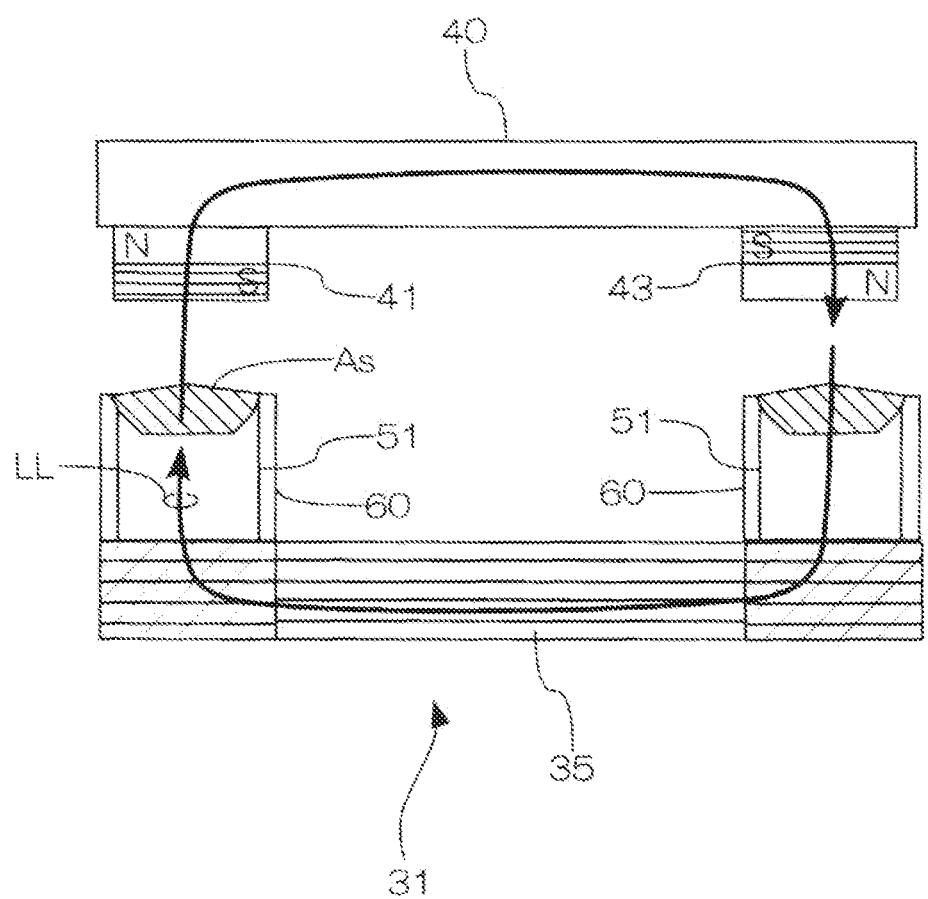
FIG. 5 is an explanatory diagram schematically showing a magnetic flux piercing through a rotor side magnet and a stator side core.

When the plurality of magnetic bodies, that is, the first magnetic body 101 and the second magnetic body 102 are provided in the core 51, obtained torque is different depending on the positions of the magnetic bodies. This is explained below. FIG. 5 is an explanatory diagram schematically showing a state in which a field magnet for rotating the rotor 40 is formed in the axial gap motor 20. As shown in FIG. 5, when one of rotating field magnets is focused and electric currents i in the opposite directions are fed to the coil 61 provided in the core 51 facing the permanent magnet 41 having an S pole on the stator 31 side among a plurality of permanent magnets attached to the surface of the rotor 40 and the coil 61 provided in the core 51 facing the permanent magnet 43 having an N pole on the stator 31 side among the plurality of permanent magnets, a magnetic flux is formed to pass from the permanent magnet 41 to a yoke on the rotor 40 side, from the other permanent magnet 43 to the core 51 facing the permanent magnet 43, and the yoke 35 on the stator 31 side to which the core 51 is attached and pass the core 51 facing the permanent magnet 41. According to movement of the field magnet, the axial gap motor 20 rotates the rotor 40. The length of a magnetic path in which the field magnet passes is hereinafter referred to as magnetic path length LL.

Figure 6:
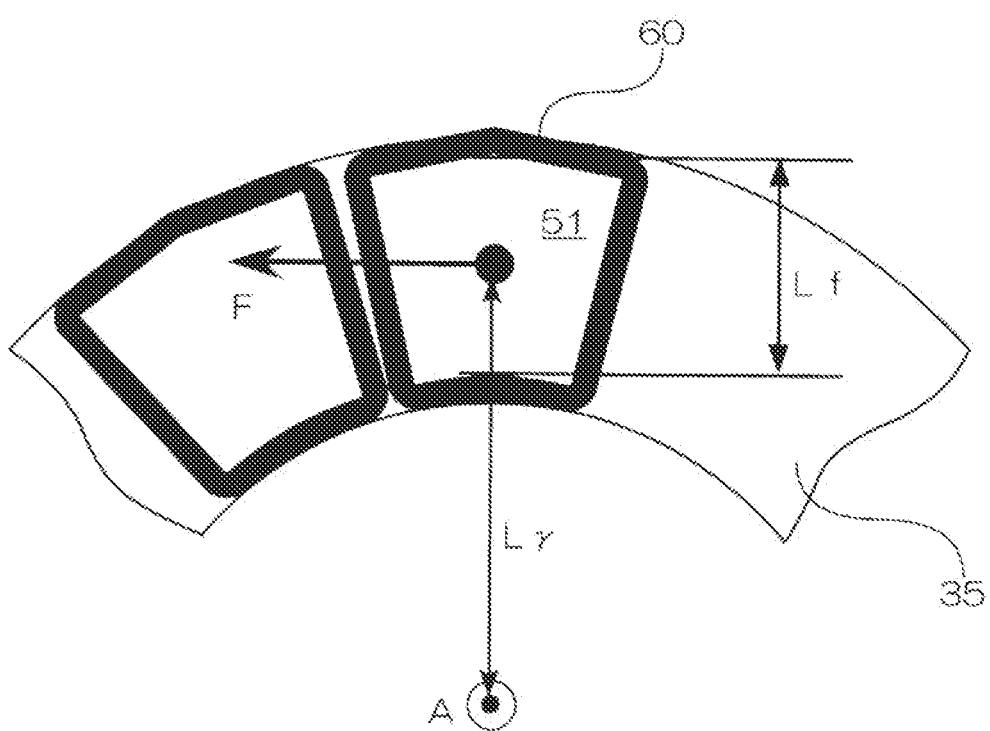
FIG. 6 is an explanatory diagram for explaining the magnitude of force acting on the core.

Torque T output from the axial gap motor 20 in this case is calculated by the following Expression (1) from a radius Lγ of the rotor 40 and an electromagnetic force F acting on the core 51 as shown in FIG. 6.

$$T = F \cdot L\gamma \qquad (1)$$

The electromagnetic force F can be calculated by the following Expression (2) according to the Fleming's left hand rule.

$$F = B \times i \times Lf = B \times i \times Nt \times 2Np \times Lf \times \alpha \qquad (2)$$

where, B represents magnetic flex density of a field magnet L, i represents an amount of an electric current flowing in a coil, Lf represents the length of the coil orthogonal to a magnetic field, Nt represents the number of windings of the coil per one pole, Np represents the number of poles of a stator, and α represents a correction coefficient.

Figure 7:
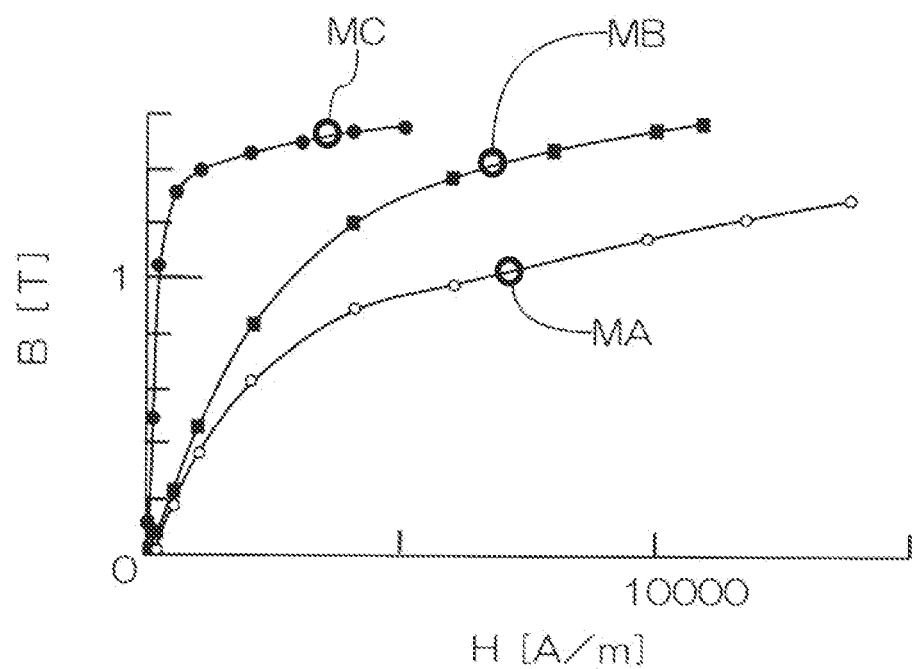
FIG. 7 is an explanatory diagram illustrating a B-H characteristic of the core.

Therefore, if parameters of the axial gap motor 20 are the same, the torque T is proportional to the magnetic flux density B. The magnetic flux density B is magnetic flux density at operating points of the permanent magnets 41 and 43. The operating points are determined by B-H characteristic lines, which are demagnetization curves, of the permanent magnets 41 and 43 and a permeance coefficient Pc. This is explained with reference to FIGS. 7 and 8. FIG. 7 is a graph showing B-H characteristics for each of materials. Magnetic flux density B[T] at the time when a magnetic field H [A/m] is increased are practically determined by differences among materials MA, MB, and MC. In a ferromagnetic body such as a permanent magnet, a large residual magnetic flux remains even if a magnetic field is reset to 0. Therefore, to increase the torque of a motor not limited to the axial gap motor 20, the material MC showing large magnetic flux density B with respect to the same magnetic field H is used.

Figure 8:
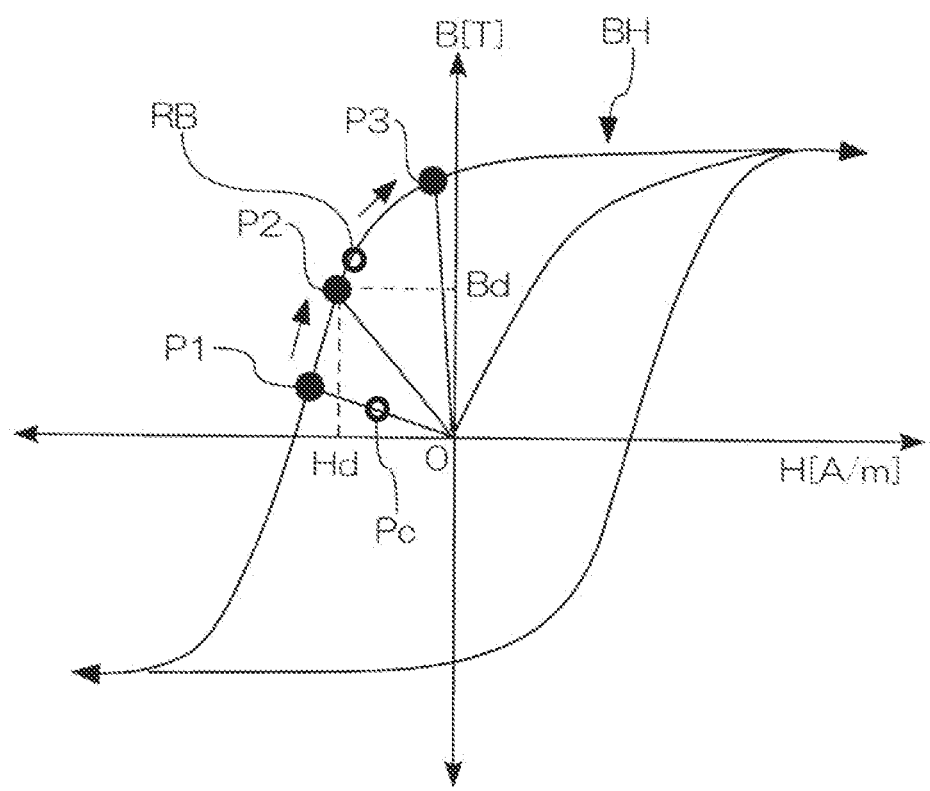
FIG. 8 is an explanatory diagram illustrating an operating point calculated from the B-H characteristic and a permeance coefficient.

An example of a third quadrant in a B-H characteristic line of a specific material shown as a solid line BH, that is, a characteristic in the case in which a residual magnetic flux is reduced by a magnetic field in the opposite direction (indicated by a solid line RB; hereinafter referred to as demagnetization characteristic) is shown in FIG. 8. If an operating point is set on a side on which the magnetic flux density is as high as possible, that is, further on an operating point P2 side than an operating point P1 and is further set to an operating point P3, the magnetic flux density B of the operating point increases and the torque T also increases. As an example, a ratio of a magnetic field Hd and magnetic flux density Bd at the operating point P2, that is, Pc=Bd/Hd is a coefficient representing a state of a magnetic circuit. This coefficient is referred to as permeance coefficient Pc. The permeance coefficient Pc is decided by the following Expression (3) in a magnetic circuit of the axial gap motor 20, that is, a circuit shown in FIG. 7.

$$Pc=\mu(As/LL) \tag{3}$$

where, μ represents magnetic permeability of a material configuring the magnetic circuit, As represents a magnetic path sectional area shown in FIG. 5, and LL is a magnetic path length shown in FIG. 5. Therefore, as it is seen from the above Expression (3), to bring the operating point close to the P3 side and increase the magnetic flux density B, a sectional area of a magnetic path in the magnetic circuit only has to be increased or a magnetic path length of the magnetic path only has to be reduced.

On the other hand, in the axial gap motor 20 in the first embodiment, as shown in FIG. 4, the first magnetic body 101 is provided in contact with the inner peripheral wall of the first side surface SC1 of the bobbin 60 and the second magnetic body 102 is provided in contact with the inner peripheral wall of the second side surface SC2 of the bobbin 60. If an occupied area of a magnetic body on the inside of the core 51 in a plan view along the rotation axis A is the same, the form of the core 51 in this embodiment contributes to reducing the magnetic path length LL compared with when the magnetic body is present near the center of the core 51. In this way, in this embodiment, the magnetic path length LL can be reduced. Therefore, the permeance coefficient Pc indicated by Expression (3) can be increased. As a result, it is possible to operate the axial gap motor 20 at an operating point where the magnetic flux density B is higher. As a result, it is possible to increase the output torque T of the axial gap motor 20.

As explained above, the axial gap motor 20 in the first embodiment achieves action effects of <1> to <8> described below.

<1> It is easy to manufacture the core 51 because the first magnetic body 101 and the second magnetic body 102 have the same shape.

<2> It is possible to dispose the first magnetic body 101 and the second magnetic body 102 to more easily obtain high output torque compared with when magnetic bodies having the same area is disposed in the core 51 more closely to the center of the core 51.

For an axial gap motor, it is difficult to achieve both of these two action effects, that is, the facilitation of manufacturing of the magnetic bodies forming the core 51 and the increase in the output torque. The significance of being able to simultaneously achieve both the action effects is great.

<3> Since the first magnetic body 101 and the second magnetic body 102 have the same shape, the electromagnetic steel sheets 71 used for manufacturing can be only one type.

<4> In the first embodiment, the first magnetic body 101 and the second magnetic body 102 are symmetrically provided with respect to a straight line passing the center of the core 51 and the rotation axis A. Therefore, a weight balance in the core 51 is good. It is possible to suppress occurrence of vibration irrespective of a rotating direction of the rotor 40.

<5> Further, in the first embodiment, the electromagnetic steel sheets 71 configuring the first magnetic body 101 and the second magnetic body 102 are laminated along a first axis conforming to the radial direction R. Accordingly, it is possible to suppress magnetic fluxes passing in the same direction with respect to a laminating direction of the electromagnetic steel sheets 71. Therefore, it is possible to prevent magnetic resistance from increasing, suppress occurrence of an eddy current, and improve efficiency of the axial gap motor 20.

<6> In the first embodiment, both the end portions in laminating directions of the first magnetic body 101 and the second magnetic body 102 are in contact with the third side surface SC3 and the fourth side surface SC4 of the bobbin 60. Therefore, it is possible to dispose the electromagnetic steel sheets 71 longest along the radial direction R. Moreover, the magnetic bodies are present in portions close to the coil 61. This is desirable in improving efficiency as well.

<7> Besides, in the first embodiment, in a state in which the bobbin 60 is fit, the first magnetic body 101 and the second magnetic body 102 are held by the third side surface SC3 and the fourth side surface SC4 of the bobbin 60. Accordingly, it is possible to easily position the bobbin 60 and the coil 61 using the first magnetic body 101 and the second magnetic body 102 welded on the yoke 35.

<8> In the first embodiment, since the void portion 75 is provided between the first magnetic body 101 and the second magnetic body 102, it is also easy to dispose a nonmagnetic material in the void portion 75 and realize fixing and prevention of positional deviation of the first magnetic body 101 and the second magnetic body 102. If the first magnetic body 101 and the second magnetic body 102 are supported by supporting members provided in the void portion 75, it is possible to improve durability and the like of the stator 31.

B. Second Embodiment

A second embodiment is explained. In all of second to fifth embodiments, a basic configuration of the axial gap motor 20 is the same as the basic configuration in the first embodiment. In the embodiments, the configuration of a core is different. Therefore, about the embodiments below, the core is mainly explained.

Figure 9:
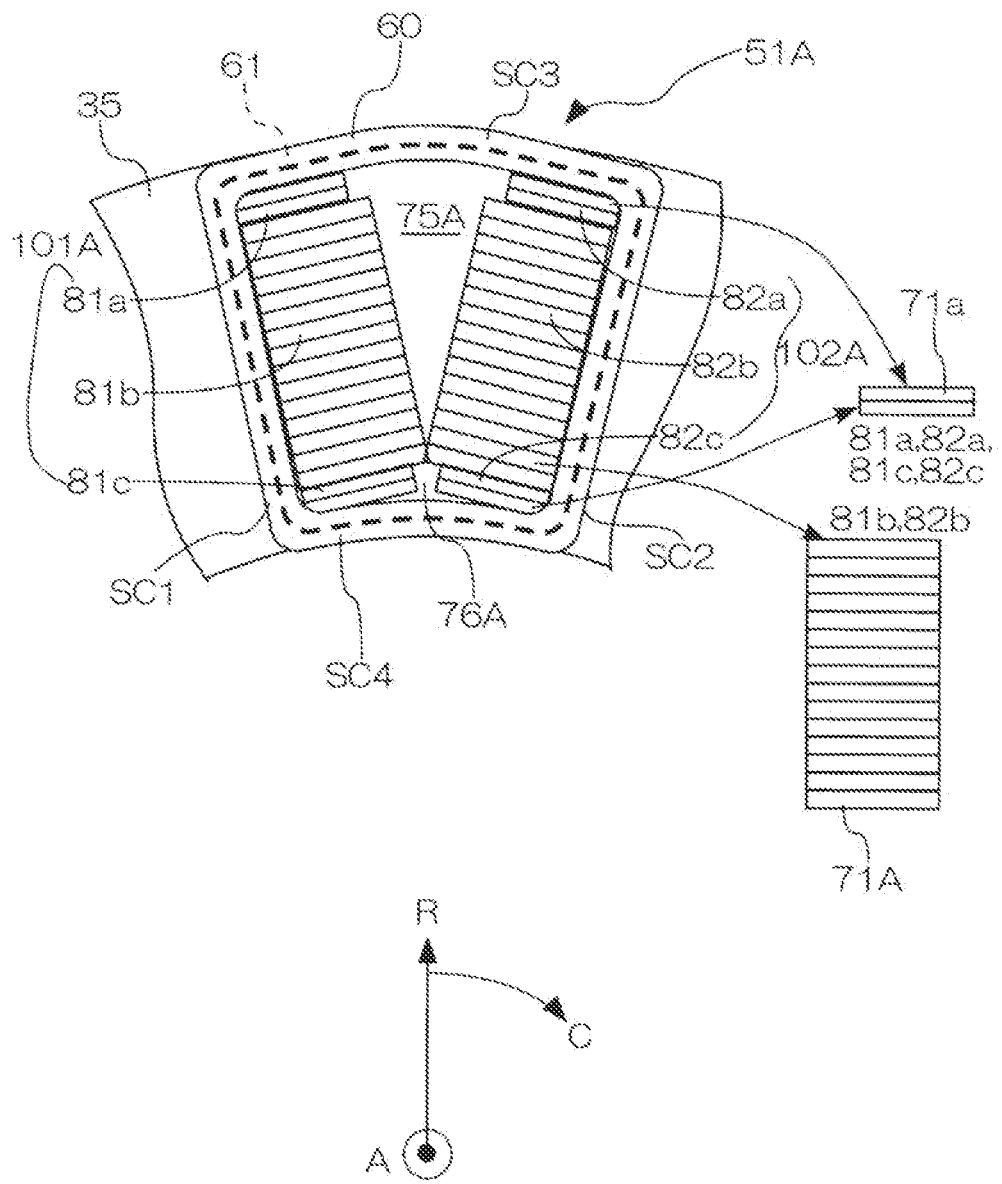
FIG. 9 is an explanatory diagram showing a configuration example of a core in a second embodiment.

A core 51A in the second embodiment includes, as shown in FIG. 9, a first magnetic body 101A and a second magnetic body 102A. The first magnetic body 101A and the second magnetic body 102A are formed in the same shape. The first magnetic body 101A is configured from a first end portion member 81*a* and a second end portion member 81*c* configured from small electromagnetic steel sheets 71*a* and a center member 81*b* obtained by laminating electromagnetic steel sheets 71A larger than the electromagnetic steel sheets 71*a*. In this embodiment, the first end portion member 81*a*, the center member 81*b*, and the second end portion member 81*c* are integrally formed in this order using half-caulking. The three members may be integrated by bonding, welding, or the like. Like the first magnetic body 101A, the second magnetic body 102A is configured by integrating a first end portion member 82*a* and a second end portion member 82*c* and a center member 82*b*. In this embodiment, the center members 81*b* and 82*b* are equivalent to first and second magnetic sections and the first end portion members 81*a* and 82*a* and the second end portion members 81*c* and 82*c* are equivalent to third and fourth magnetic sections.

As in the first embodiment, the side surfaces on the opposite side of the center of the core 51A, that is, the outer side of the first magnetic body 101A and the second magnetic body 102A are in contact with the inner peripheral walls of the first side surface SC1 and the second side surface SC2 of the bobbin 60. The first end portion members 81*a* and 82*a* are in contact with the inner peripheral wall of the third side surface SC3 of the bobbin 60. The second end portion members 81*c* and 82*c* are in contact with the inner peripheral wall of the fourth side surface SC4 of the bobbin 60.

The electromagnetic steel sheets 71A used in the center member 81*b* of the first magnetic body 101A and the center member 82*b* of the second magnetic body 102A are larger than the electromagnetic steel sheets 71 used in the first magnetic body 101 and the second magnetic body 102 in the first embodiment. Accordingly, the end portions of the center member 81*b* and the center member 82*b* located on the inner side with respect to the radial direction R are in contact with each other before coming into contact with the fourth side surface SC4. The second end portion members 81*c* and 82*c* are disposed in a gap from the end portions of the center member 81*b* and the center member 82*b* to the inner peripheral wall of the fourth side surface SC4. Void portions 75A and 76A are formed on the center side of the core 51A between the first magnetic body 101A and the second magnetic body 102A. Supporting members supporting the first magnetic body 101A and the second magnetic body 102A may be provided in the void portions 75A and 76A.

In the second embodiment explained above, as in the first embodiment, the action effects <1> and <2> explained above are achieved. Further, the action effects <4>to <8>explained above among the action effects in the first embodiment can also be achieved. In the second embodiment, the volume of the first magnetic bodies 101A and 102A can be set larger than the volume in the first embodiment. Further improvement of the output torque can also be obtained. Electromagnetic steel sheets used in the second embodiment can be only two types, that is, the electromagnetic steel sheets 71*a* forming the first end portion member 81*a* and the second end portion member 81*c* and the like and the electromagnetic steel sheets 71A larger than the electromagnetic steel sheets 71*a* and forming the center member 81*b* and the like. An effect of facilitation of manufacturing is achieved to a certain degree.

C. Third Embodiment

A third embodiment is explained. As shown in FIG. 10, a core 51B of the axial gap motor 20 in the third embodiment is configured from a first magnetic body 101B and a second magnetic body 102B. The first magnetic body 101B and the second magnetic body 102B are formed in the same shape. Compared with the second embodiment, in the core 51B in the third embodiment, a first end portion member 83*a* of the first magnetic body 101B and a first end portion member 84*a* of the second magnetic body 102B are configured from electromagnetic steel sheets 71*b* larger than the electromagnetic steel sheets 71*a* of the first end portion member 81*a* and the first end portion member 82*a* in the second embodiment. The other members are the same as the members in the second embodiment in shapes, the numbers of laminated pieces, laminating methods, and the like. The first end portion member 83*a*, the center member 81*b*, and the second end portion member 81*c* are integrally formed in this order using half-caulking as in the other embodiments. Naturally, the three members may be integrated by bonding, welding, or the like. In this embodiment, the center members 81*b* and 82*b* are equivalent to the first and second magnetic sections and the first end portion members 83*a* and 84*a* and the second end portion members 81*c* and 82*c* are equivalent to the third and fourth magnetic sections.

Like the first magnetic body 101B, the second magnetic body 102B is also configured by integrating the first end portion member 84*a*, the center member 82*b*, and the second end portion member 82*c*. As in the first embodiment, the side surfaces on the opposite side of the center of the core 51B, that is, the outer side of the first magnetic body 101B and the second magnetic body 102B are in contact with the inner peripheral walls of the first side surface SC1 and the second side surface SC2 of the bobbin 60. The first end portion members 83*a* and 84*a* are in contact with the inner peripheral wall of the third side surface SC3 of the bobbin 60. The second end portion members 81*c* and 82*c* are in contact with the inner peripheral wall of the fourth side surface SC4 of the bobbin 60. Void portions 75B and 76B are formed on the center side of the core 51B between the first magnetic body 101B and the second magnetic body 102B. Supporting members supporting the first magnetic body 101B and the second magnetic body 102B may be provided in the void portions 75B and 76B.

The electromagnetic steel sheets 71*b* used in the first end portion member 83*a* of the first magnetic body 101B and the first end portion member 84*a* of the second magnetic body 102B are larger than the electromagnetic steel sheets 71*a* used in the first magnetic body 101A and the second magnetic body 102A in the second embodiment. Accordingly, a ratio of the magnetic bodies in the core 51B is larger than the ratio in the second embodiment. A magnetic flux formed by the core 51B can be increased in size. This contributes to increasing the output torque of the axial gap motor 20 as well.

In the third embodiment explained above, in addition to the effects explained above, as in the first embodiment, the action effects <1> and <2>e xplained above are achieved. Further, the action effects <4> to <8> explained above among the action effects in the first embodiment can also be achieved. In the third embodiment, the electromagnetic steel sheets 71*b* used in the first end portion member 83*a* of the first magnetic body 101B and the first end portion member 84*a* of the second magnetic body 102B are larger than the electromagnetic steel sheets 71*a* used in the first magnetic body 101A and the second magnetic body 102A in the second embodiment. Accordingly, a ratio of the magnetic bodies in the core 51B is larger than the ratio in the second embodiment. A magnetic flux formed by the core 51B can be increased in size. This contributes to increasing the output torque of the axial gap motor 20 as well. Electromagnetic steel sheets used in the third embodiment can be only three types, that is, the electromagnetic steel sheets 71*a* forming the second end portion members 81*c* and 82*c*, the electromagnetic steel sheets 71A larger than the electromagnetic steel sheets 71*a* and forming the center members 81*b* and 82*b*, and the electromagnetic steel sheets 71*b* larger than the electromagnetic steel sheets 71A and forming the first end portion members 83*a* and 84*a*. An effect of facilitation of manufacturing is also achieved to a certain degree.

In the third embodiment, for convenience of explanation, the center member 81*b* of the first magnetic body 101B and the center member 82*b* of the second magnetic body 102B are explained as having the same shape as the members in the second embodiment. However, the laminating direction length of the center members 81*b* and 82*b* may be reduced and, instead, the laminating direction length of first end portion members 83*a* and 84*a* may be increased. This can contribute to increasing a ratio of the magnetic bodies in the core 51B and improving torque. The laminating direction lengths of the members may be changed by adjusting the numbers of laminated pieces of the electromagnetic steel sheets or may be changed by adjusting the thicknesses of the electromagnetic steel sheets.

D. Fourth Embodiment

A fourth embodiment is explained. As shown in FIG. 11, a core 51C of the axial gap motor 20 in the fourth embodiment is configured from a first magnetic body 101C and a second magnetic body 102C. The first magnetic body 101C and the second magnetic body 102C are integrally configured and have a symmetrical shape with respect to a straight line passing the center of the core 51C and the rotation axis A. Compared with the other embodiments, although the center member 81b of the first magnetic body 101C and the center member 82b of the second magnetic body 102C configuring the core 51C in the fourth embodiment are the same as the members in the second and third embodiments, a first common member 85 and a second common member 87 are provided at both ends of the center members 81b and 82b instead of the first end portion member and the second end portion member in the second and third embodiments. In the fourth embodiment and a fifth embodiment explained below, the first common member 85 and the second common member 87 are equivalent to a third magnetic section.

The first common member 85 is configured by placing a plurality of electromagnetic steel sheets 73 of the same shape bent in the center one on top of another. The second common member 87 is configured by placing electromagnetic steel sheets 74 of the same shape bent in the center one on top of another. As a result, the first common member 85 and the second common member 87 also have a shape bent in the center. The bending conforms to a degree of the bending of the third side surface SC3 and the fourth side surface SC4 of the bobbins 60. The first common member 85, the center members 81b and 82b of the first magnetic body 101C and the second magnetic body 102C, and the second common member 87 are integrally formed using half-caulking as in the other embodiments. Naturally, all or a part of the members may be fixed by bonding, welding, or the like. As in the second and third embodiments, the side surfaces on the opposite side of the center of the core 51C, that is, the outer side of the first magnetic body 101C and the second magnetic body 102C are in contact with the inner peripheral walls of the first side surface SC1 and the second side surface SC2 of the bobbin 60. The first common member 85 is in contact with the inner peripheral wall of the third side surface SC3 of the bobbin 60. The second common member 87 is in contact with the inner peripheral wall of the fourth side surface SC4 of the bobbin 60. A void portion 75C is formed in the center of the core 51C surrounded by the first magnetic body 101C and the second magnetic body 102C. Supporting members supporting the first magnetic body 101C and the second magnetic body 102C may be provided in the void portion 75C.

In the fourth embodiment explained above, as in the other embodiments, the action effects <1> and <2> explained above are achieved. Further, the action effects <4> to <8> explained above can also be achieved. Each of the electromagnetic steel sheets 73 and 74 used in the first common member 85 and the second common member 87 provided in common to the first magnetic body 101C and the second magnetic body 102C are larger than two pieces of each of the electromagnetic steel sheets 71a and 71b used in the first magnetic body 101B and the second magnetic body 102B in the third embodiment. Accordingly, a ratio of the magnetic bodies in the core 51C is larger than the ratio in the third embodiment. A magnetic flux formed by the core 51C can be increased in size. This contributes to increasing the output torque of the axial gap motor 20 as well. Electromagnetic steel sheets used in the fourth embodiment can be only three types, that is, the electromagnetic steel sheets 71A forming the center members 81b and 82b, the bent electromagnetic steel sheets 73 forming the first common member 85, and the bent electromagnetic steel sheets 74 forming the second common member 87. An effect of facilitation of manufacturing is also achieved to a certain degree.

E. Fifth Embodiment

Figure 12:
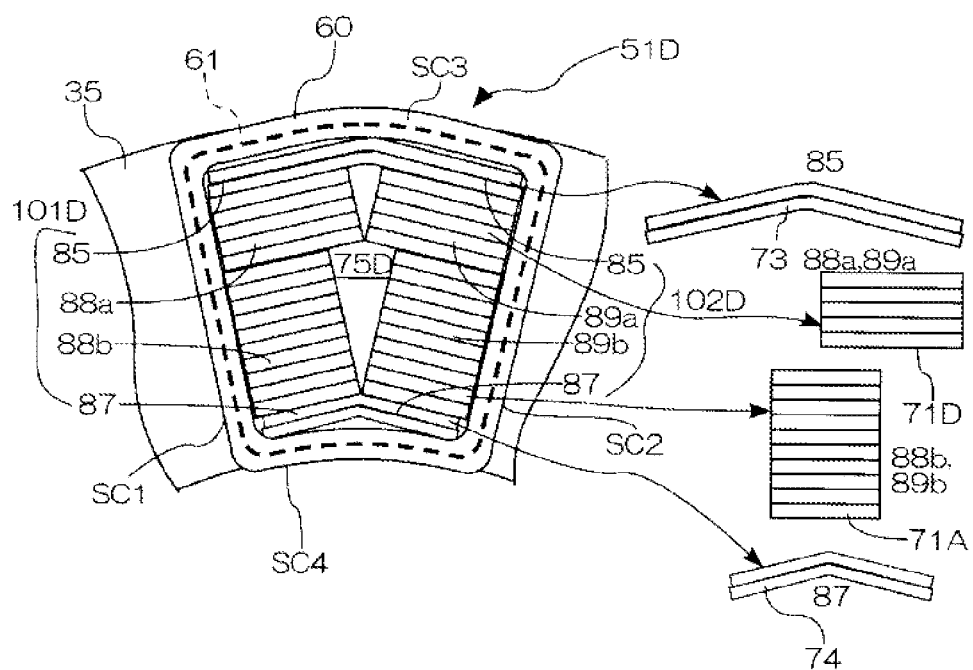
FIG. 12 is an explanatory diagram showing a configuration example of a core in a fifth embodiment.

A fifth embodiment is explained. As shown in FIG. 12, a core 51D of the axial gap motor 20 in the fifth embodiment is configured from a first magnetic body 101D and a second magnetic body 102D. The first magnetic body 101D and the second magnetic body 102D are integrally configured and have a symmetrical shape with respect to a straight line passing the center of the core 51D and the rotation axis A. Compared with the other embodiments, the first common member 85 and the second common member 87 in the fifth embodiment are the same as those in the fourth embodiment. However, the fifth embodiment is different in that the first magnetic body 101D is configured from a first center member 88a and a second center member 88b and the second magnetic body 102D is configured from a first center member 89a and a second center member 89b.

As in the other embodiments, the first common member 85, the first center member 88a and the second center member 88b of the first magnetic body 101D, the first center member 89a and the second center member 89b of the second magnetic body 102D, and the second common member 87 are integrally formed by a method such as half-caulking. As in the second and third embodiments, the side surfaces on the opposite side of the center of the core 51D, that is, the outer side of the first magnetic body 101D and the second magnetic body 102D are in contact with the inner peripheral walls of the first side surface SC1 and the second side surface SC2 of the bobbin 60. As in the fourth embodiment, the first common member 85 is bent in the center and is in contact with the inner peripheral wall of the third side surface SC3 of the bobbin 60 and the second common member 87 is also bent in the center and is in contact with the inner peripheral wall of the fourth side surface SC4 of the bobbin 60. A void portion 75D is formed in the center of the core 51D surrounded by the first magnetic body 101D and the second magnetic body 102D. Supporting members supporting the first magnetic body 101D and the second magnetic body 102D may be provided in the void portion 75D.

In the fifth embodiment explained above, as in the other embodiments, the action effects <1> and <2> explained above are achieved. Further, the action effects <4> to <8> explained above can also be achieved. Electromagnetic steel sheets 71D used in the first center member 88a configuring the first magnetic body 101D and the first center member 89a configuring the second magnetic body 102D are larger than the electromagnetic steel sheets 71a used in the first magnetic body 101C and the second magnetic body 102C in the fourth embodiment. Accordingly, a ratio of the magnetic bodies in the core 51D is larger than the ratio in the fourth embodiment. A magnetic flux formed by the core 51D can be increased in size. This contributes to increasing the output torque of the axial gap motor 20 as well. Electromagnetic steel sheets used in the fifth embodiment can be only four types, that is, the electromagnetic steel sheets 71D forming the first center members 88a and 89a, the electromagnetic steel sheets 71A forming the second center members 88b and 89b, the bent electromagnetic steel sheets 73 forming the first common member 85, and the bent electromagnetic steel sheets 74 forming the second common member 87. An effect of facilitation of manufacturing is also achieved to a certain degree.

F. Other Embodiments

Various forms of disposition of magnetic bodies inside a core are conceivable. Various kinds of disposition are classified into several types and explained below. The classification into the types is for convenience of explanation. It goes without saying that the various kinds of disposition can be variously combined without being limited to be classified. In the following explanation, a first magnetic body and a second magnetic body are sometimes collectively referred to as "divided cores" meaning that the magnetic bodies disposed on the inside of the core 51 are configured to be divided.

[1] Type T1

FIG. 13 shows variations of another embodiment (hereinafter, type T1) in which first and second magnetic bodies configuring a core are symmetrical. In a configuration example shown as the type T1 in FIG. 13, the number of divided cores is two, a type of the divided cores is one type, and a type of electromagnetic steel sheets is also one type. A type T1A indicates a form in which a first magnetic body 101E and a second magnetic body 102E, that is, two divided cores have the same shape and one of the end portions in laminating directions of the divided cores is in contact with the inner peripheral wall of the third side surface SC3, which is the outer periphery side end portion, of the bobbin 60. A type T1B indicates a form in which the other of the end portions in the laminating directions of the divided cores is in contact with the inner peripheral wall of the fourth side surface SC4, which is the inner periphery side end portion, of the bobbin 60. Further, a type T1C indicates a form in which the divided cores have the same shape, one of the end portions in a laminating direction of the first magnetic body 101E, which is one of the divided cores, is in contact with the inner peripheral wall of the fourth side surface SC4 of the bobbin 60, and one of the end portions in a laminating direction of the second magnetic body 102E, which is the other of the divided cores, is in contact with the inner peripheral wall of the third side surface SC3 of the bobbin 60. In these forms as well, the effects <1> to <5> and <8> explained in the first embodiment can be achieved.

Suffixes A to C of the type T1 respectively indicate a form in which the divided cores are in contact with the inner peripheral wall of the third side surface SC3, which is the outer periphery side end portion, and are not in contact with the inner peripheral wall of the fourth side surface SC4, which is the inner periphery side end portion, a form in which the divided cores are not in contact with the inner peripheral wall of the third side surface SC3 and are in contact with the inner peripheral wall of the fourth side surface SC4, and a form in which only one of the divided cores is in contact with the inner peripheral wall of the third side surface SC3 and only the other is in contact with the inner peripheral wall of the fourth side surface SC4. The suffixes are the same in the following explanation.

[2] Type T2

Figure 14:
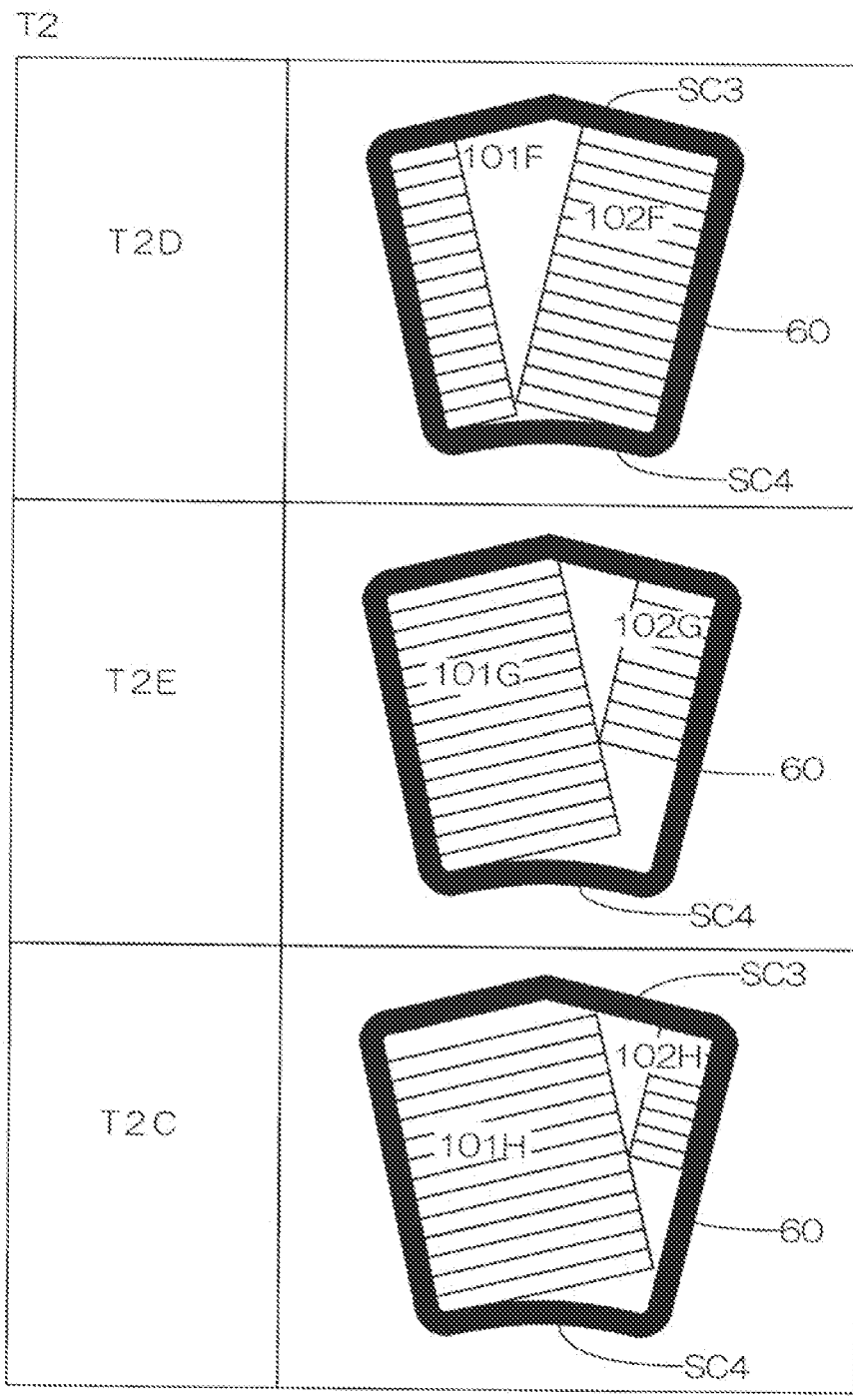
FIG. 14 is an explanatory diagram showing a configuration example of a type T2 core.

FIG. 14 shows variations of an embodiment (a type T2) in which first and second magnetic bodies configuring a core is asymmetrical. In these cores shown as the type T2 in FIG. 14, the number of divided cores is two, types of the divided cores are two types, and types of electromagnetic steel sheets are also two types. A type T2D indicates a form in which a first magnetic body 101F and a second magnetic body 102F, that is, two divided cores have different shapes and both of the end portions in laminating directions of the divided cores are in contact with the inner peripheral wall of the third side surface SC3, which is the outer periphery side end portion, of the bobbin 60 and the inner peripheral wall of the fourth side surface SC4, which is the inner periphery side end portion, of the bobbin 60. In this form, the effects <1>, <2>, and <5> to <8> explained in the first embodiment can be achieved. A suffix D indicates the same form in the following explanation, that is, the form in which both of the divided cores are in contact with the inner peripheral walls of the third side surface SC3 and the fourth side surface SC4.

A type T2E indicates a form in which the end portions in a laminating direction of a first magnetic body 101G, which is one of divided cores, is in contact with the inner peripheral walls of the third side surface SC3 and the fourth side surface SC4 of the bobbin 60 and one of the laminating direction end portions of a second magnetic body 102G, which is the other of the divided cores, is in contact with the inner peripheral wall of the third side surface SC3 of the bobbin 60. A suffix E indicates the same form in the following explanation, that is, the form in which one of the divided cores is in contact with the inner peripheral walls of the third side surface SC3 and the fourth side surface SC4 and the other is in contact with the inner peripheral wall of the third side surface SC3.

Further, a type T2C indicates a form in which a ratio of a first magnetic body 101H, which is one of divided cores, in the core 51 is maximized, one of the end portions in a laminating direction of the first magnetic body 101H is in contact with the inner peripheral wall of the fourth side surface SC4, which is the inner periphery side end portion, of the bobbin 60 and one of the end portions in a laminating direction of a second magnetic body 102H, which is the other of the divided cores, is in contact with the inner peripheral wall of the third side surface SC3, which is the outer periphery side end portion, of the bobbin 60. In the types T2E and T2C, the effects <1>, <2>, <5>, and <8> explained in the first embodiment can be achieved. Moreover, a ratio of the magnetic bodies in the core 51 can be set higher than the ratio of the type T2D.

[3] Type T3

Figure 15:
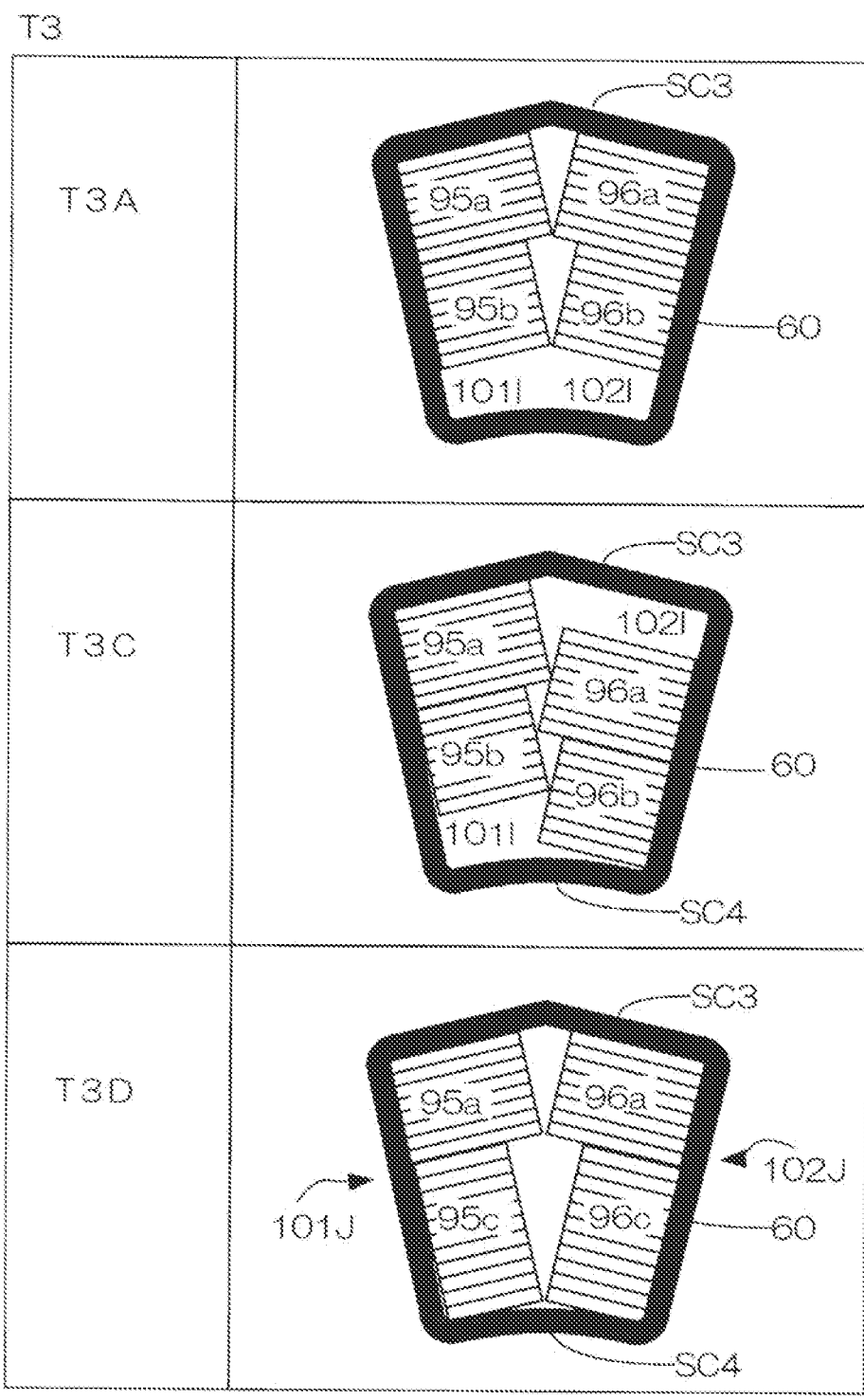
FIG. 15 is an explanatory diagram showing a configuration example of a type T3 core.

FIG. 15 shows variations of another embodiment (hereinafter, a type T3) in which there are a plurality of types of divided cores and first and second magnetic bodies are symmetrical. In a configuration example shown as the type T3 in FIG. 15, the number of divided cores is four, types of the divided cores are two types, and types of electromagnetic steel sheets are also two types. In a type T3A, a first magnetic body 101I is configured from a first divided portion 95a and a second divided portion 95b and a second magnetic body 102I is configured from a first divided portion 96a and a second divided portion 96b. The type T3A has a form in which the first divided portions 95a and 96a have the same shape and the second divided portions 95b and 96b have the same shape and ones of the end portions in laminating directions of both of the first divided portions 95a and 96a and the second divided portions 95b and 96b are in contact with the inner peripheral wall of the third side surface SC3, which is the outer periphery side end portion of the bobbin 60. In this form as well, the effects <1>, <2>, <4>, <5>, and <8> explained in the first embodiment can be achieved.

A type T3C indicates a form in which the first magnetic body 101I and the second magnetic body 102I have the same shape, one of the end portions in a laminating direction of the first magnetic body 101I is in contact with the inner peripheral wall of the third side surface SC3 of the bobbin 60, and one of the end portions in a laminating direction of the second magnetic body 102I is in contact with the inner peripheral wall of the fourth side surface SC4 of the bobbin 60. In this form as well, the effects <1>, <2>, <5>, and <8> explained in the first embodiment can be achieved.

A type T3D indicates a form in which a first magnetic body 101J and a second magnetic body 102J have the same shape and both the end portions in laminating directions of the first magnetic body 101J and the second magnetic body 102J are in contact with the inner peripheral wall of the third side surface SC3 and the inner peripheral wall of the fourth side surface SC4 of the bobbin 60. In this form as well, the effects <1>, <2>, and <4> to <8> explained in the first embodiment can be achieved. Moreover, for example, compared with the first embodiment, a ratio of the magnetic bodies in the core can be increased. It is possible to further improve the output torque of the axial gap motor 20.

[4] Type T4

Figure 16:
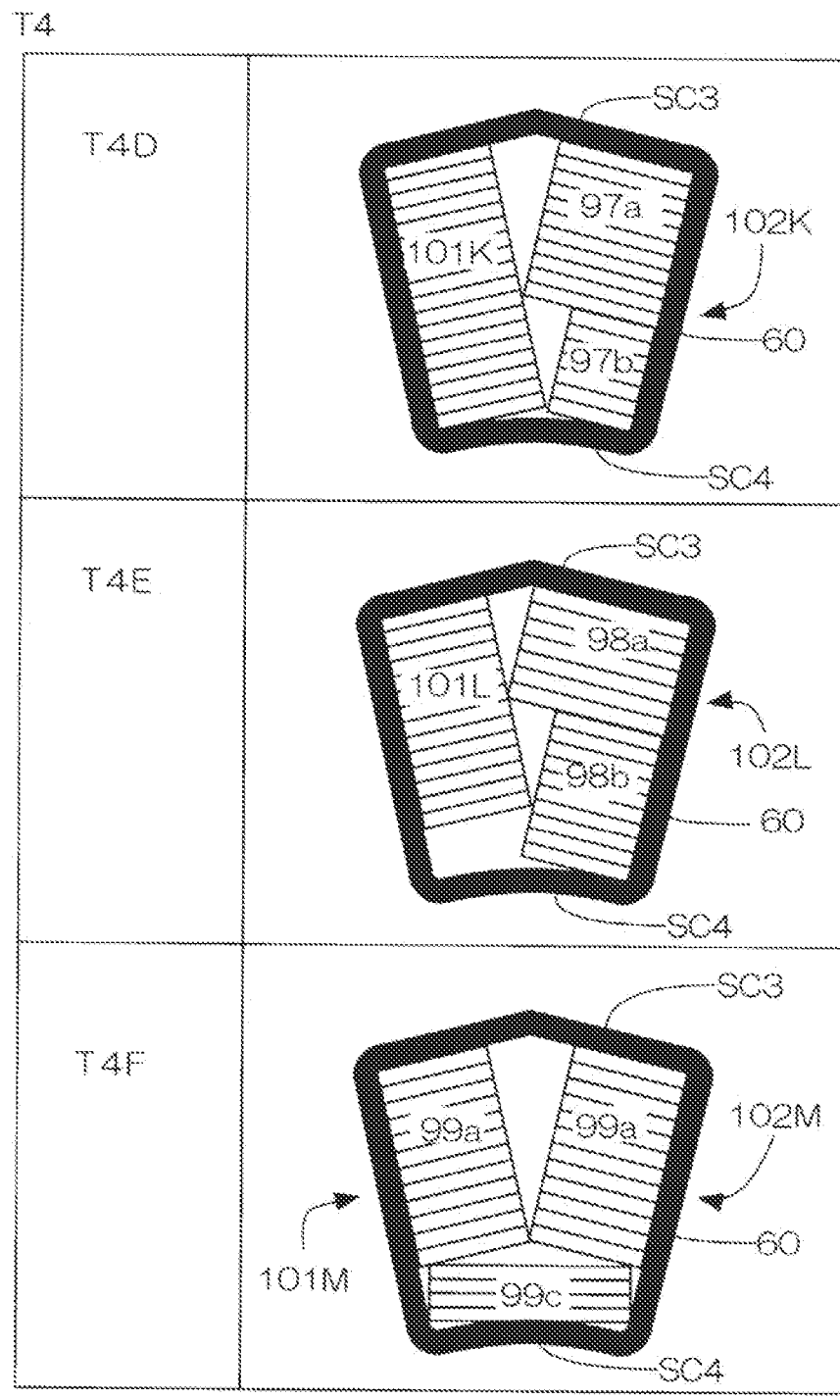
FIG. 16 is an explanatory diagram showing a configuration example of a type T4 core.

FIG. 16 shows variations of an embodiment (a type T4) in which the number of divided cores is an odd number. In these cores shown in FIG. 16 as the type T4, the number of divided cores is an odd number, types of the divided cores are two types (in a type T4F) or three types (in types T4D and T4E), and types of electromagnetic steel sheets are two types (in the types T4E and T4F) or three types (in the type T4D). In the type T4D, a first magnetic body 101K and a second magnetic body 102K have different shapes and the first magnetic body 101K is formed by laminating the same electromagnetic steel sheets and, on the other hand, in the second magnetic body 102K, a first divided portion 97a and a second divided portion 97b configured from electromagnetic steel sheets of different sizes are separately laminated and thereafter integrated. The integration can be performed by a known method such as half-caulking. In the type T4D, electromagnetic steel sheets of three kinds of sizes are used. Both the end portions in laminating directions of the first magnetic body 101K and the second magnetic body 102K are in contact with the inner peripheral walls of the third side surface SC3 and the fourth side surface SC4, which are the outer periphery side end portions, of the bobbin 60. In this form, the effects <1>, <2>, and <5> to <8> explained in the first embodiment can be achieved.

In the type T4E, the laminating direction length of a first magnetic body 101L is set shorter than the laminating direction length of the first magnetic body 101K of the type T4D and, instead, electromagnetic steel sheets forming a second divided portion 98b configuring a second magnetic body 102L are formed larger than electromagnetic steel sheets forming the second divided portion 97b of the type T4D. Electromagnetic steel sheets forming a first divided portion 98a configuring the second magnetic body 102L are also formed larger than electromagnetic steel sheets forming the first divided portion 97a of the type T4D. Moreover, in the type T4E, since electromagnetic steel sheets forming the first magnetic body 101L and the electromagnetic steel sheets forming the second divided portion 98b are formed in the same shape, the electromagnetic steel sheets can be only two types. One of the end portions in a laminating direction of the first magnetic body 101L is in contact with the inner peripheral wall of the third side surface SC3, which is the outer periphery side end portion, of the bobbin 60. In contrast, both the end portions in a laminating direction of the second magnetic body 102L are in contact with the inner peripheral walls of the third side surface SC3 and the fourth side surface SC4, which are the outer periphery side end portions, of the bobbin 60. In this form, the effects <1>, <2>, <5>, and <8> explained in the first embodiment can be achieved. Moreover, for example, compared with the type T4D, a ratio of the magnetic bodies in the core can be increased. It is also possible to further increase the output torque of the axial gap motor 20.

Further, as shown in the type T4F, it is also possible to set the number of divided cores configuring a core to an odd number and, at the same time, form a first magnetic body 101M and a second magnetic body 102M in the same shape and symmetrical with respect to a straight line passing the center of the core and the rotation axis A. In the type T4F, the first magnetic body 101M and the second magnetic body 102M are configured by first and second divided cores 99a of the same shape and a third divided core 99c is provided separately from the first and second divided cores 99a. As in the fourth and fifth embodiments, the third divided core 99c may be formed using bent electromagnetic steel sheets and formed in a shape bent in the center. In this form, the effects <1>, <2>, and <4> to <8> explained in the first embodiment can be achieved.

[5] Type T5

Figure 17:
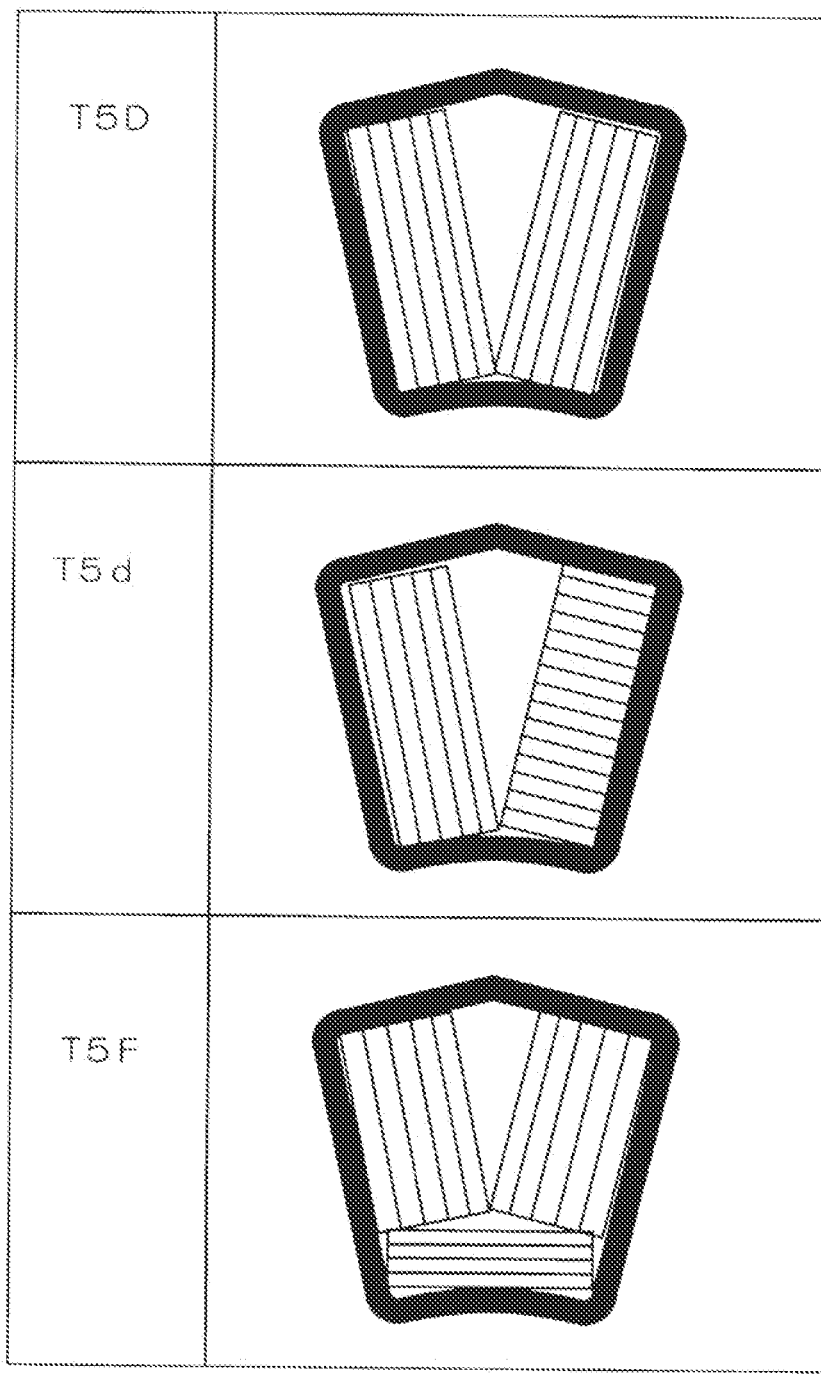
FIG. 17 is an explanatory diagram showing a configuration example of a type T5 core.

FIG. 17 shows variations of an embodiment (a type T5) in which laminating directions of electromagnetic steel sheets forming divided cores are different. In these cores shown as the type T5 in FIG. 17, disposition of the divided cores may be the disposition in any one of the first to fifth embodiments and the types T1 to T4 explained above. However, the laminating directions of the electromagnetic steel sheets are different in at least one of the divided cores. In a type T5D, two divided cores have the same shape and are provided symmetrically with respect to a straight line passing the center of a core and the rotation axis A. Therefore, the type T5D is the same as the first embodiment in terms of a shape. However, a laminating direction of electromagnetic steel sheets is different from the laminating direction in the first embodiment by 90 degrees and is a direction conforming to the circumferential direction C. In this form, the electromagnetic steel sheets can be only one type. The effects <1> to <8> explained in the first embodiment can be achieved. The number of electromagnetic steel sheets to be laminated can be reduced. In some case, a laminating process in forming divided cores can be simplified.

A type T5d has a form in which one of the divided cores in the type T5D is replaced with the same divided core as the divided core in the first embodiment. In this way, laminating directions of a plurality of divided cores may be differentiated. In this form as well, the effects <1>, <2>, and <4> to <8> explained in the first embodiment can be achieved. Types of electromagnetic steel sheets can be only two types. A part of the divided cores can be formed by laminating a small number of electromagnetic steel sheets. Further, as shown as a type T5F, a combination of the divided cores, the laminating directions of the electromagnetic steel sheets of which are different, may be a configuration in which laminating directions of electromagnetic steel sheets of a part of an odd number of divided cores are differentiated. In this case, substantially the same effects as the effects of the type T4F are achieved.

[6] Other Configuration Examples of Cores

Figure 18:
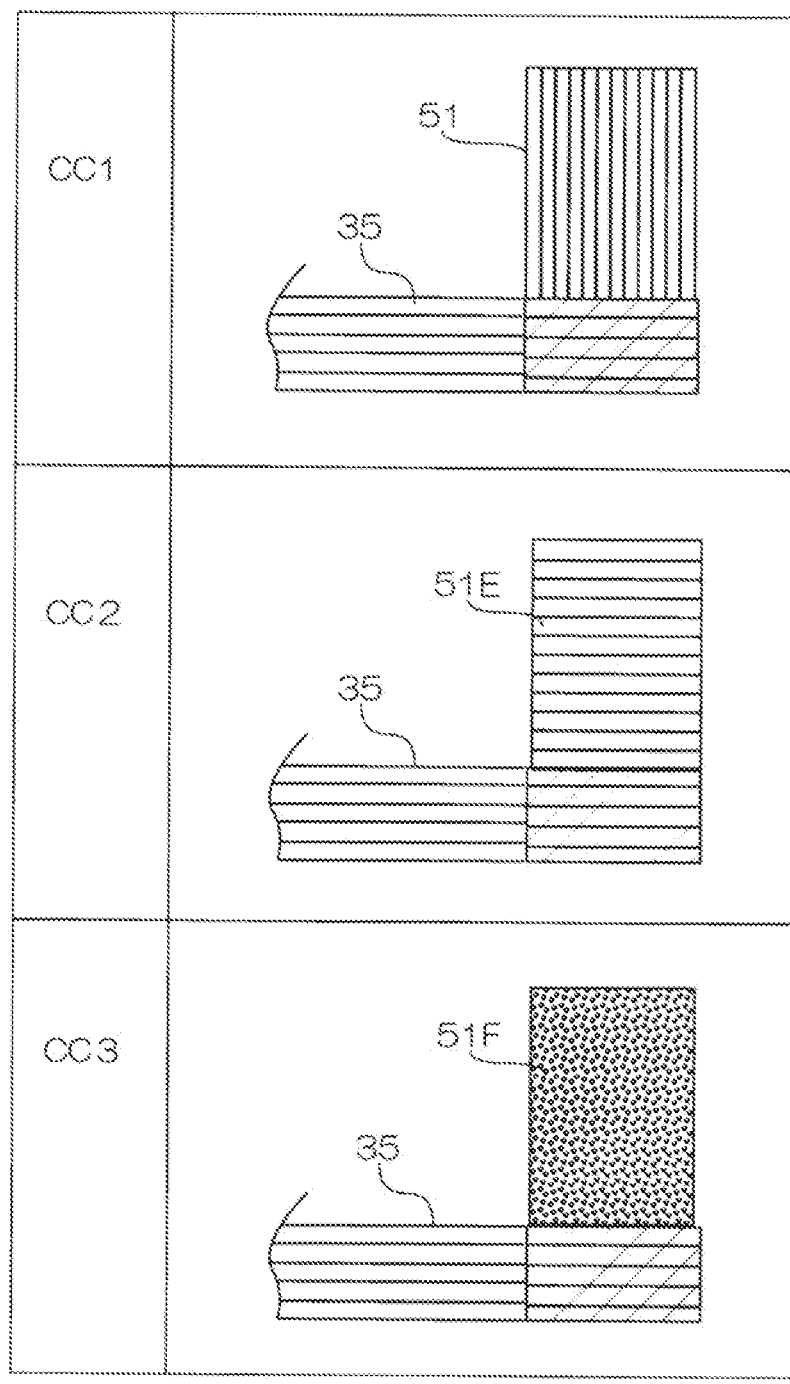
FIG. 18 is an explanatory diagram showing configuration examples of other cores.

As a core configured from divided cores, a core in which a laminating direction of electromagnetic steel sheets is the same as a laminating direction of electromagnetic steel sheets of the yoke 35 can also be adopted. A configuration of a core not including electromagnetic steel sheets can also be adopted. Examples of these configurations are summarized in FIG. 18. FIG. 18 is drawn as a sectional view in which one of cores is fractured on a plane passing the rotation axis A. In a configuration example CC1 shown in FIG. 18, as shown in the first to fifth embodiments and the types T1 to T5, electromagnetic steel sheets are formed as a vertically laminated layer, that is, a laminating direction of the electromagnetic steel sheets is set to a direction orthogonal to the axial direction of the rotation axis A. The laminating direction may be any direction if the direction is orthogonal to the rotation axis A. For example, the electromagnetic steel sheets may be laminated along the radial direction R, which is outward from the rotation axis A, or may be laminated along the circumferential direction C. Naturally, the laminating direction may be a direction conforming to the radial direction R or the circumferential direction C, that is, a direction slightly deviating from the radial direction R or the circumferential direction C according to the shape of the bobbin 60.

As a laminating direction of electromagnetic steel sheets forming a divided core, as shown as a configuration example CC2, a laminating direction of a horizonal laminated layer, that is, electromagnetic steel sheets may be a direction along the axial direction of the rotation axis A. In this case, since the laminating direction is the same direction as the laminating direction of the electromagnetic steel sheets in the yoke 35, a gap less easily occurs between the yoke 35 and a core 51E. It is easy to form a magnetic flux.

Alternatively, the divided core may be configured as a green compact. In a configuration example CC3, the divided core is the green compact. The divided core by the green compact is formed by putting powder of a magnetic body in a mold and applying high pressure to the powder under high temperature. A manufacturing method for a green compact is briefly explained. First, powder of a magnetic body to be a divided core is prepared. The magnetic body powder is put in a core-shaped mold prepared in advance and heated and pressurized. Consequently, the magnetic body powder is solidified and a green compact is formed. A particle diameter of the powder is selected as appropriate according to a magnetic body material in use, target magnetic permeability of a core, and the like. Subsequently, the external shape of the green compact removed from the mold is machined into the shape of the divided core. The shape of the divided core includes not only height and width but also, for example, the shape of a portion where a yoke and divided cores are fixed. In the case of the powder of the magnetic body, it is sometimes difficult to elaborate a fine shape only with the mold. In such a case, post-machining only has to be performed. The post-machining can be performed by, for example, an endmill. Naturally, the post-machining is unnecessary when a practically usable shape can be formed by only the mold.

The configurations of the cores using the various divided cores are explained above. However, the configurations of the cores are not limited to these configurations. For example, the cores illustrated as the first to fifth embodiments, the types T1 to T5, the configuration examples CC1 to CC3, and the like may be combined as appropriate, for example, divided cores using the electromagnetic steel sheets and the divided cores of the green compact may be combined. The number of divisions of the divided cores may be five or more for each of the first magnetic body 101 and the second magnetic body 102. Further, the numbers of divisions of the first magnetic body 101 and the second magnetic body 102 may be different. A sum of the numbers of divisions of the first magnetic body 101 and the second magnetic body 102 may be an even number, for example, the first magnetic body 101 is divided into two and the second magnetic body 102 is divided into four.

G. Other Aspects (1) As another aspect, an axial gap motor in an aspect described below can be provided. The axial gap motor is an axial gap motor including: a rotor; and a stator disposed to be separated with a gap from the rotor in a direction parallel to a rotation axis of the rotor. The stator includes: a plurality of bobbins housing coils; and a core provided on an inside of each of the bobbins and configured by a plurality of magnetic sections. A first magnetic section among the plurality of magnetic sections is in contact with an inner peripheral wall of, among side portions of the bobbin, a first side portion opposed to a side portion of a bobbin on one side adjacent to the bobbin. A second magnetic section among the plurality of magnetic sections is in contact with an inner peripheral wall of, among the side portions of the bobbin, a second side portion opposed to a side portion of a bobbin on another side adjacent to the bobbin. A void portion is present between the first magnetic section and the second magnetic section. Consequently, in the axial gap motor, it is possible to achieve facilitation of manufacturing of magnetic bodies forming the core and an increase in output torque.

(2) In such an axial gap motor, the first magnetic section and the second magnetic section may have a same shape. Consequently, the core can be configured by a small number of kinds of members.

(3) In such an axial gap motor, the first magnetic section and the second magnetic section may be provided symmetrically with respect to a straight line passing a center of the core and the rotation axis. Consequently, it is possible to make a balance of the core symmetric. It is possible to stably rotate the rotor irrespective of a rotating direction of the rotor.

(4) In such an axial gap motor, in a plan view of the core in a direction along the rotation axis, one of the first magnetic section and the second magnetic section may have a shape having an area larger than an area of a shape of the other of the first magnetic section and the second magnetic section. Consequently, it is possible to realize the axial gap motor having large output torque in one direction.

(5) In such an axial gap motor, in the first magnetic section and the second magnetic section, sheets of magnetic bodies may be laminated. When the sheets of the magnetic bodies are laminated to form the first and second magnetic sections, it is possible to suppress generation of an eddy current. It is possible to improve efficiency of the axial gap motor.

(6) In such an axial gap motor, the sheets of the first magnetic section and the second magnetic section may have a same shape. Consequently, characteristics of the first and second magnetic sections are easily made uniform.

(7) In such an axial gap motor, the sheets may be laminated along a first axis conforming to a radial direction of the stator. Consequently, since a magnetic flux passing in the same direction as a laminating direction of the sheets can be suppressed, it is possible to prevent magnetic resistance from increasing, suppress generation of an eddy current, and improve efficiency of the axial gap motor.

(8) In such an axial gap motor, the sheets may be laminated along a second axis conforming to a circumferential direction of the stator. Consequently, if sheets of the same thickness is used, it is possible to reduce the number of the sheets. It is easy to laminate the sheets.

(9) In such an axial gap motor, any one of the plurality of magnetic sections may be in contact with an inner peripheral wall of, among the side portions of the bobbin, a third side portion present on a radial direction outer side of the stator. Consequently, it is easy to position any one of the magnetic sections and the inner peripheral wall of the bobbin present on the radial direction outer side of the stator.

(10) In such an axial gap motor, any one of the plurality of magnetic sections may be in contact with an inner peripheral wall of, among the side portions of the bobbin, a fourth side portion present on a radial direction inner side of the stator. Consequently, it is easy to position any one of the magnetic sections and the inner peripheral wall of the bobbin present on the radial direction inner side of the stator.

(11) In such an axial gap motor, the core may include, as the plurality of magnetic sections, a third magnetic section coupling the first magnetic section and the second magnetic section. Consequently, it is possible to increase a ratio of the magnetic bodies in the core and increase an output of the axial gap motor.

(12) In such an axial gap motor, the third magnetic section may couple the first magnetic section and the second magnetic section on at least one of a radial direction outer side and a radial direction inner side of the stator. Consequently, it is possible to further increase the ratio of the magnetic bodies in the core and further increase the output of the axial gap motor.

(13) In such an axial gap motor, the core may further include a third magnetic section and a fourth magnetic section as the plurality of magnetic sections, the third magnetic section may be in contact with one of an inner peripheral wall of the first side portion and an inner peripheral wall of the second side portion, and the fourth magnetic section may be in contact with the other of the inner peripheral wall of the first side portion and the inner peripheral wall of the second side portion. Consequently, even when the third and fourth magnetic sections are present, in the axial gap motor, it is possible to achieve both of facilitation of manufacturing of the magnetic bodies forming the core and an increase in output torque.

(14) In such an axial gap motor, the axial gap motor may include, among the plurality of magnetic sections, supporting members supporting the magnetic sections. Consequently, the magnetic sections can be supported by the supporting members. It is possible to improve durability of the stator.

(15) The present disclosure is not limited to the embodiments explained above. The present disclosure can be realized in various configurations without departing from the gist of the present disclosure. For example, technical features in the embodiments corresponding to technical features in the aspects described in the summary can be substituted or combined as appropriate in order to solve a part or all of the problems described above or achieve a part or all of the effects described above. Unless the technical features are not explained as essential technical features in this specification, the technical features can be deleted as appropriate. The side surfaces forming the bobbin may be referred to as side portions.

What is claimed is:

1. An axial gap motor comprising:
   a rotor; and
   a stator disposed to be separated with a gap from the rotor in a direction parallel to a rotation axis of the rotor, wherein
   the stator includes:
      a bobbin housing a coil; and
      a core provided on an inside of the bobbin and configured by a plurality of magnetic sections,
   a first magnetic section among the plurality of magnetic sections is in contact with an inner peripheral wall of, among side portions of the bobbin, a first side portion opposed to a side portion of a bobbin on one side adjacent to the bobbin,
   a second magnetic section among the plurality of magnetic sections is in contact with an inner peripheral wall of, among the side portions of the bobbin, a second side portion opposed to a side portion of a bobbin on another side adjacent to the bobbin, and
   a void portion is present between the first magnetic section and the second magnetic section.

2. The axial gap motor according to claim 1, wherein the first magnetic section and the second magnetic section have a same shape.

3. The axial gap motor according to claim 2, wherein the first magnetic section and the second magnetic section are provided symmetrically with respect to a straight line passing a center of the core and the rotation axis.

4. The axial gap motor according to claim 1, wherein, in a plan view of the core in a direction along the rotation axis, one of the first magnetic section and the second magnetic section has an area larger than an area of the other of the first magnetic section and the second magnetic section.

5. The axial gap motor according to claim 1, wherein the first magnetic section and the second magnetic section are configured by laminating sheets of magnetic bodies.

6. The axial gap motor according to claim 5, wherein the sheets of the first magnetic section and the second magnetic section have a same shape.

7. The axial gap motor according to claim 5, wherein the sheets are laminated along a first axis conforming to a radial direction of the stator.

8. The axial gap motor according to claim 5, wherein the sheets are laminated along a second axis conforming to a circumferential direction of the stator.

9. The axial gap motor according to claim 1, wherein any one of the plurality of magnetic sections is in contact with an inner peripheral wall of, among the side portions of the bobbin, a third side portion present on a radial direction outer side of the stator.

10. The axial gap motor according to claim 1, wherein any one of the plurality of magnetic sections is in contact with an inner peripheral wall of, among the side portions of the bobbin, a fourth side portion present on a radial direction inner side of the stator.

11. The axial gap motor according to claim 1, wherein the core includes, as the plurality of magnetic sections, a third magnetic section coupling the first magnetic section and the second magnetic section.

12. The axial gap motor according to claim 11, wherein the third magnetic section is disposed on at least one of a radial direction outer side and a radial direction inner side of the stator and couples the first magnetic section and the second magnetic section.

13. The axial gap motor according to claim 1, wherein the core further includes a third magnetic section and a fourth magnetic section as the plurality of magnetic sections, the third magnetic section is in contact with one of an inner peripheral wall of the first side portion and an inner peripheral wall of the second side portion, and the fourth magnetic section is in contact with the other of the inner peripheral wall of the first side portion and the inner peripheral wall of the second side portion.

14. The axial gap motor according to claim 1, further comprising, among the plurality of magnetic sections, supporting members supporting the magnetic sections.

* * * * *